US012008946B2

(12) United States Patent
Park et al.

(10) Patent No.: US 12,008,946 B2
(45) Date of Patent: Jun. 11, 2024

(54) DISPLAY DEVICE

(71) Applicant: SAMSUNG DISPLAY CO., LTD., Yongin-si (KR)

(72) Inventors: Kyu-Jin Park, Yongin-si (KR); Woon-Rok Jang, Yongin-si (KR); Tae-Seok Ha, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/328,133

(22) Filed: Jun. 2, 2023

(65) Prior Publication Data

US 2024/0062701 A1 Feb. 22, 2024

(30) Foreign Application Priority Data

Aug. 18, 2022 (KR) ........................ 10-2022-0103147

(51) Int. Cl.
*G09G 3/20* (2006.01)
*G09G 3/3233* (2016.01)

(52) U.S. Cl.
CPC ......... *G09G 3/2096* (2013.01); *G09G 3/2007* (2013.01); *G09G 3/3233* (2013.01); *G09G 2300/0819* (2013.01); *G09G 2300/0842* (2013.01); *G09G 2310/08* (2013.01); *G09G 2320/0247* (2013.01); *G09G 2320/045* (2013.01); *G09G 2320/0626* (2013.01); *G09G 2320/0673* (2013.01); *G09G 2330/021* (2013.01); *G09G 2360/16* (2013.01)

(58) Field of Classification Search
CPC .. G09G 3/2096; G09G 3/2007; G09G 3/3233; G09G 2300/0819; G09G 2300/0842; G09G 2310/08; G09G 2320/0247; G09G 2320/045; G09G 2320/0626; G09G 2320/0673; G09G 2330/021; G09G 2360/16
See application file for complete search history.

(56) References Cited

U.S. PATENT DOCUMENTS

| | | | |
|---|---|---|---|
| 10,109,228 | B2 | 10/2018 | Hoffman et al. |
| 10,219,007 | B2 | 2/2019 | Francois et al. |
| 10,839,772 | B2 | 11/2020 | Hyun |

(Continued)

FOREIGN PATENT DOCUMENTS

| | | |
|---|---|---|
| KR | 10-2019-0116599 | 10/2019 |
| KR | 10-2020-0144775 | 12/2020 |

(Continued)

*Primary Examiner* — Koosha Sharifi-Tafreshi
(74) *Attorney, Agent, or Firm* — F. Chau & Associates, LLC

(57) ABSTRACT

A display device includes a display panel that displays an image, a panel driver that drives the display panel, and a driving controller that controls driving of the panel driver. The driving controller compensates first image data corresponding to a first area of the display panel where a still image is displayed during at least a predetermined time period, in a first compensation method to generate first compensation image data for the first area, and compensates second image data corresponding to a second area of the display panel different from the first area in a second compensation method different from the first compensation method that uses a load calculated based on previous image data.

22 Claims, 20 Drawing Sheets

(56) References Cited

U.S. PATENT DOCUMENTS

| | | | | |
|---|---|---|---|---|
| 11,030,967 | B2 * | 6/2021 | Kim | G06T 7/0002 |
| 11,170,479 | B2 | 11/2021 | Kim et al. | |
| 11,244,596 | B2 * | 2/2022 | Park | G09G 3/2092 |
| 11,250,774 | B2 * | 2/2022 | Kang | G09G 3/3225 |
| 2022/0122234 | A1 | 4/2022 | Yim | |

FOREIGN PATENT DOCUMENTS

| | | |
|---|---|---|
| KR | 10-2021-0004007 | 1/2021 |
| KR | 10-2326311 | 11/2021 |
| KR | 10-2022-0053102 | 4/2022 |
| KR | 10-2389652 | 4/2022 |

* cited by examiner

C_LUT

| Grayscale \ Change Amount | -0.4 | -0.3 | -0.2 | -0.1 | +0.1 | +0.2 | +0.3 | +0.4 |
|---|---|---|---|---|---|---|---|---|
| 4G | +10 | +8 | +5 | +2 | -2 | -4 | -6 | -9 |
| 8G | +10 | +7 | +5 | +2 | -2 | -4 | -6 | -9 |
| 12G | +11 | +8 | +5 | +2 | -2 | -4 | -6 | -9 |
| 16G | +12 | +8 | +5 | +2 | -2 | -4 | -6 | -9 |
| 20G | +13 | +10 | +6 | +4 | -2 | -4 | -6 | -9 |
| 24G | +11 | +9 | +5 | +2 | -2 | -4 | -6 | -9 |
| 28G | +9 | +8 | +5 | +2 | -2 | -4 | -6 | -9 |
| 32G | +8 | +6 | +5 | +2 | -2 | -4 | -6 | -9 |

DISPLAY DEVICE

CROSS-REFERENCE TO RELATED APPLICATIONS

This U.S. non-provisional patent application claims priority under 35 U.S.C. § 119 to Korean Patent Application No. 10-2022-0103147 filed on Aug. 18, 2022, in the Korean Intellectual Property Office, the disclosure of which is incorporated by reference in its entirety herein.

TECHNICAL FIELD

Embodiments of the present disclosure described herein relate to a display device, and more particularly, relate to a display device having a function to reduce power consumption.

DISCUSSION OF RELATED ART

A light emitting display device displays an image by using a light emitting diode that generates light through the recombination of electrons and holes. The light emitting display device has a fast response speed and operates with low power consumption.

The light emitting display device includes pixels connected to data lines and scan lines. Each of the pixels may include a light emitting element and a pixel circuit for controlling the amount of current flowing to the light emitting element. Power consumption may be reduced further in the light emitting display device using various techniques. However, a flickering may be observed on a display panel of the light emitting display device when one of these techniques is used, thereby reducing image quality.

SUMMARY

Embodiments of the present disclosure provide a display device for preventing a flickering phenomenon from occurring in a partial area during an operation of reducing power consumption.

According to an embodiment, a display device includes a display panel that displays an image, a panel driver that drives the display panel, and a driving controller that controls driving of the panel driver.

The driving controller compensates first image data corresponding to a first area of the display panel where a still image is displayed during at least a predetermined time period, in a first compensation method to generate first compensation image data for the first area, and compensates second image data corresponding to a second area of the display panel different from the first area in a second compensation method that uses a load calculated based on previous image data to generate second compensation image data for the second area.

According to an embodiment, a display device includes a display panel that displays an image, a panel driver that drives the display panel, and a driving controller that controls driving of the panel driver.

The driving controller receives image data during at least 'k' frames where 'k' is an integer greater than or equal to 2, extracts first image data, which is maintained to have a grayscale that is less than or equal to the reference grayscale during the least 'k' frames, and second image data, which has a grayscale higher than the reference grayscale or which is not maintained to have a grayscale that is less than or equal to the reference grayscale during the 'k' frames or more, from the image data based on a predetermined reference grayscale. The driving controller compensates the first image data in a first compensation method and compensates the second image data in a second compensation method different from the first compensation method.

According to an embodiment, a display device includes a display panel configured to display an image; a panel driver configured to drive the display panel; and a driving controller configured to control driving of the panel driver. The driving controller is configured to compensate first image data corresponding to a first area of the display panel corresponding to a still image during at least a predetermined time period, using a fixed scale factor independent of a load to generate first compensation image data for the first area. The driving controller is further configured to compensate second image data corresponding to a second area of the display panel corresponding to a moving image using the load to generate second compensation image data for the second area. The load may be based on previous image data.

BRIEF DESCRIPTION OF DRAWINGS

The above and other objects and features of the present disclosure will become apparent by describing in detail embodiments thereof with reference to the accompanying drawings.

DETAILED DESCRIPTION

Figure 1:
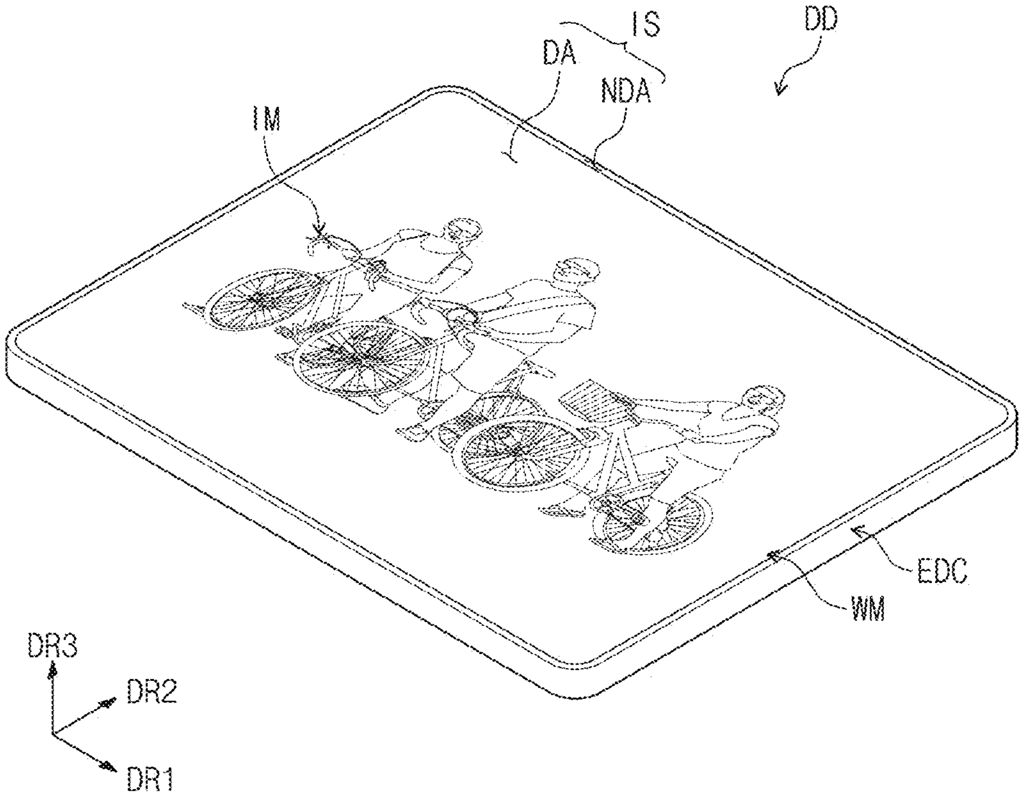
FIG. 1 is a perspective view of a display device, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in the drawings, the thickness, ratio, and dimension of components may be exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

Hereinafter, embodiments of the present disclosure will be described with reference to accompanying drawings.

Figure 2:
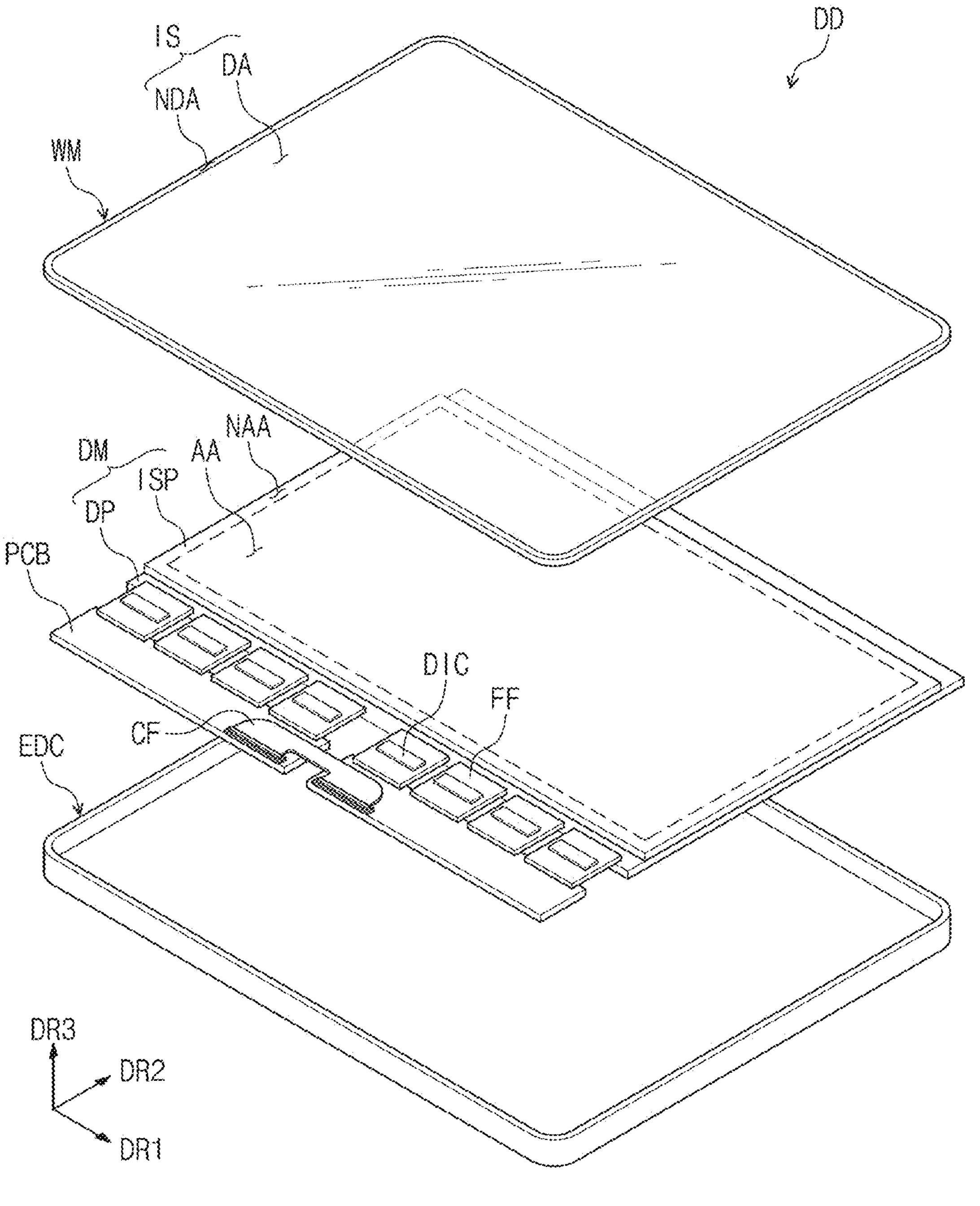
FIG. 2 is an exploded perspective view of a display device, according to an embodiment of the present disclosure.

FIG. 1 is a perspective view of a display device, according to an embodiment of the present disclosure. FIG. 2 is an exploded perspective view of a display device, according to an embodiment of the present disclosure.

Referring to FIGS. 1 and 2, a display device DD may be a device activated depending on an electrical signal. The display device DD according to the present disclosure may be a small or a medium-sized electronic device, such as a mobile phone, a tablet personal computer (PC), a notebook computer, a vehicle navigation system, or a game console, as well as a large-sized electronic device, such as a television or a monitor. However, the display device DD may be implemented as another type of a display device without departing from the concept of the present disclosure. The display device DD is in a shape of a rectangle having a long side in a first direction DR1 and a short side in a second direction DR2 intersecting the first direction DR1. However, the shape of the display device DD is not limited thereto. For example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined based on a direction in which the image IM is displayed. The front surface may be opposite to the rear surface in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Meanwhile, directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to an embodiment of the present disclosure may sense an external input of a user, which is applied from the outside. The external input of the user may be one of various types of external inputs, such as a part of his/her body, light, heat, his/her gaze, and pressure, or a combination thereof. Also, the display device DD may sense the external input of the user applied to a side surface or a rear surface of the display device DD depending on a structure of the display device DD and is not limited to an embodiment. As an example of the present disclosure, an external input may include an input entered through an input device (e.g., a stylus pen, an active pen, a touch pen, an electronic pen, or an E-pen).

The display surface IS of the display device DD may be divided into a display area DA and a non-display area NDA. The display area DA may be an area in which the image IM is displayed. A user perceives (or views) the image IM through the display area DA. In an embodiment, the display area DA is illustrated in the shape of a quadrangle whose vertexes are rounded. However, this is illustrated merely as an example. The display area DA may have various shapes and is not limited to a particular embodiment.

The non-display area NDA is adjacent to the display area DA. The non-display area NDA may have a given color. The non-display area NDA may surround the display area DA. Accordingly, a shape of the display area DA may be defined substantially by the non-display area NDA. However, this is illustrated merely as an example. The non-display area NDA may be disposed adjacent to only one side of the display area DA or may be omitted, but is not limited thereto.

As illustrated in FIG. 2, the display device DD may include a display module DM and a window WM disposed on the display module DM. The display module DM may include a display panel DP and an input sensing layer ISP.

According to an embodiment of the present disclosure, the display panel DP may include a light emitting display panel. For example, the display panel DP may be an organic light emitting display panel, an inorganic light emitting display panel, a quantum dot light emitting display panel. An emission layer of the organic light emitting display panel may include an organic light emitting material. An emission layer of the inorganic light emitting display panel may include an inorganic light emitting material. An emission layer of the quantum dot light emitting display panel may include a quantum dot, a quantum rod, or the like.

The display panel DP may output the image IM, and the image IM thus output may be displayed through the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP by a subsequent process. That is, when the input sensing layer ISP is directly disposed on the display panel DP, an inner adhesive film (not illustrated) is not interposed between the input sensing layer ISP and the display panel DP. However, the inner adhesive film may be interposed between the input sensing layer ISP and the display panel DP. In this case, the input sensing layer ISP is not manufactured together with the display panel DP through the subsequent processes. That is, the input sensing layer ISP may be manufactured through a process separate from that of the display panel DP and may then be fixed on an upper surface of the display panel DP by the inner adhesive film.

The window WM may be formed of a transparent material capable of outputting the image IM. For example, the window WM may be formed of glass, sapphire, plastic, etc. It is illustrated that the window WM is implemented with a single layer. However, embodiments of the present disclosure are not limited thereto. For example, the window WM may include a plurality of layers.

Meanwhile, although not illustrated, the non-display area NDA of the display device DD described above may correspond to an area that is defined by printing a material including a given color on one area of the window WM. As an example of the present disclosure, the window WM may include a light blocking pattern for defining the non-display area NDA. The light blocking pattern that is a colored organic film may be formed using a coating process.

The window WM may be coupled to the display module DM through an adhesive film. As an example of the present disclosure, the adhesive film may include an optically clear adhesive (OCA) film. However, the adhesive film is not limited thereto. For example, the adhesive film may include a typical adhesive or sticking agent. For example, the adhesive film may include an optically clear resin (OCR) or a pressure sensitive adhesive (PSA) film.

An anti-reflection layer may be further disposed between the window WM and the display module DM. The anti-reflection layer decreases the reflectivity of external light incident from above the window WM. The anti-reflection layer according to an embodiment of the present disclosure may include a retarder and a polarizer. The retarder may be of a film type or a liquid crystal coating type and may include a $\lambda/2$ retarder and/or a $\lambda/4$ retarder. The polarizer may be of a film type or a liquid crystal coating type. The film type may include a stretch-type synthetic resin film, and the liquid crystal coating type may include liquid crystals arranged in a given direction. The retarder and the polarizer may be implemented with one polarization film.

As an example of the present disclosure, the anti-reflection layer may also include color filters. The arrangement of the color filters may be determined in consideration of colors of light generated from a plurality of pixels PX (see FIG. 3) included in the display panel DP. In this case, the anti-reflection layer may further include a light blocking pattern disposed between the color filters.

The display module DM may display the image IM depending on an electrical signal and may transmit/receive information about an external input. The display module DM may be defined by an active area AA and an inactive area NAA. The active area AA may be defined as an area (i.e., an area where the image IM is displayed) through which the image IM is output from the display panel DP. Also, the active area AA may be defined as an area in which the input sensing layer ISP senses an external input applied from the outside. According to an embodiment, the active area AA of the display module DM may correspond to (or overlap with) at least part of the display area DA.

The inactive area NAA is adjacent to the active area AA. The inactive area NAA may be an area in which the image IM is not substantially displayed. For example, the inactive area NAA may surround the active area AA. However, this is illustrated merely as an example. The inactive area NAA may have various shapes but is not limited to a specific embodiment. According to an embodiment, the inactive area NAA of the display module DM corresponds to (or overlaps with) at least part of the non-display area NDA.

The display device DD may further include a plurality of flexible films FF connected to the display panel DP. As an example of the present disclosure, a data driver 230 (see FIG. 3) may include a plurality of driver chips DIC, and the plurality of driver chips DIC may be mounted on the plurality of flexible films FF, respectively.

The display device DD may further include at least one circuit board PCB coupled to the plurality of flexible films FF. As an example of the present disclosure, four circuit boards PCB are provided in the display device DD, but the number of circuit boards PCB is not limited thereto. Two adjacent circuit boards among the circuit boards PCB may be electrically connected to each other by a connection film CF. Also, at least one of the circuit boards PCB may be electrically connected to a main board. A driving controller 100 (see FIG. 3) and a voltage generator 300 (see FIG. 3) may be disposed on at least one of the circuit boards PCB.

FIG. 2 illustrates a structure in which the driver chips DIC are respectively mounted on the flexible films FF, but the present disclosure is not limited thereto. For example, the driver chips DIC may be directly mounted on the display panel DP. In this case, a portion of the display panel DP, on which the driver chips DIC is mounted, may be bent such that the driver chips DIC is disposed on a rear surface of the display module DM.

The input sensing layer ISP may be electrically connected to the circuit boards PCB through the flexible films FF. However, embodiments of the present disclosure are not limited thereto. That is, the display module DM may additionally include a separate flexible film for electrically connecting the input sensing layer ISP and the circuit boards PCB.

The display device DD further includes a housing EDC for accommodating the display module DM. The housing EDC may be coupled with the window WM to define the exterior appearance of the display device DD. The housing EDC may absorb external shocks and may prevent a foreign material/moisture or the like from infiltrating into the display module DM such that components accommodated in the housing EDC are protected. Meanwhile, as an example of the present disclosure, the housing EDC may be provided in the form of a combination of a plurality of accommodating members.

The display device DD according to an embodiment may further include an electronic module including various functional modules for operating the display module DM, a power supply module (e.g., a battery) for supplying power for overall operations of the display device DD, a bracket coupled with the display module DM and/or the housing EDC to partition an inner space of the display device DD, etc.

Figure 3:
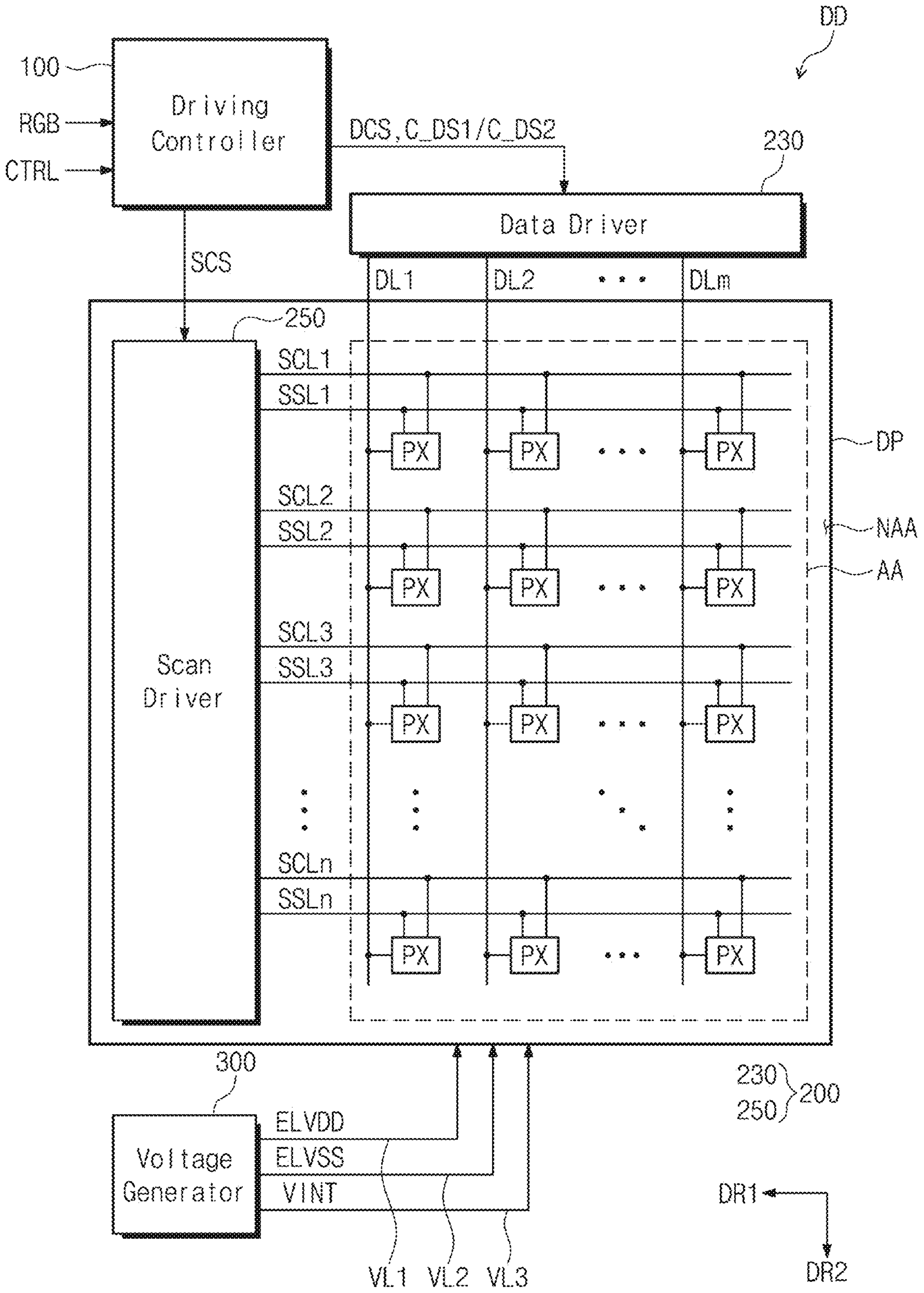
FIG. 3 is a block diagram of a display device, according to an embodiment of the present disclosure.

FIG. 3 is a block diagram of a display device, according to an embodiment of the present disclosure.

Referring to FIG. 3, the display device DD includes the display panel DP, a panel driver 200 (e.g., a driver circuit) for driving the display panel DP, and a driving controller 100 for controlling driving of the panel driver 200. As an example of the present disclosure, the panel driver 200 includes a data driver 230 (e.g., a driver circuit) and a scan driver 250 (e.g., a driver circuit).

The driving controller 100 receives an input image signal RGB and a control signal CTRL from a main controller (e.g., a microcontroller or a graphics controller). The driving controller 100 may generate image data by converting a data format of the input image signal RGB to a format in compliance with the specification for an interface with the data driver 230. The driving controller 100 may receive the input image signal RGB in units of frames. The image data may be referred to differently depending on the corresponding frame. That is, image data converted from the input image signal RGB received during a previous frame is referred to as "previous image data", and image data converted from the input image signal RGB received during a current frame may be referred to as "current image data".

The driving controller 100 may classify the input image signal RGB into first image data corresponding to a first area, in which a still image is displayed during a predetermined time or more, and second image data corresponding to a second area different from the first area. For example, a moving image may be displayed in the second area. The driving controller 100 generates first compensation image data C_DS1 by compensating the first image data in a first compensation method and generates second compensation image data C_DS2 by compensating the second image data in a second compensation method different from the first compensation method. As an example of the present disclosure, the second compensation method may be a compensation method using a load calculated based on the previous image data.

The driving controller 100 generates a scan control signal SCS and a data control signal DCS based on the control signal CTRL.

The data driver 230 receives the data control signal DCS from the driving controller 100. The data driver 230 receives the first and second compensation image data C_DS1 and C_DS2 from the driving controller 100. In an embodiment, the data driver 230 converts the first and second compensation image data C_DS1 and C_DS2 into data voltages (or data signals) based on a gamma reference voltage and outputs the data voltages to a plurality of data lines DL1 to DLm, which will be described later. The data voltages are analog voltages corresponding to grayscale values of the first and second compensation image data C_DS1 and C_DS2. The data voltages converted from the first compensation image data C_DS1 may be referred to as "first compensation data voltages". The data voltages converted from the second compensation image data C_DS2 may be referred to as "second compensation data voltages".

As an example of the present disclosure, the data driver 230 may be positioned in the driver chips DIC shown in FIG. 2.

The scan driver 250 receives the scan control signal SCS from the driving controller 100. In response to the scan control signal SCS, the scan driver 250 may output first scan signals to first scan lines SCL1 to SCLn to be described later and may output second scan signals to second scan lines SSL1 to SSLn to be described later.

The display panel DP includes the first scan lines SCL1 to SCLn, the second scan lines SSL1 to SSLn, the data lines DL1 to DLm, and pixels PX. The display panel DP may be divided into the active area AA and the inactive area NAA. The pixels PX may be positioned in the active area AA. The scan driver 250 may be positioned in the inactive area NAA.

In an embodiment, the first scan lines SCL1 to SCLn and the second scan lines SSL1 to SSLn extend in parallel with the first direction DR1 and are arranged spaced from each other in the second direction DR2. In an embodiment, the data lines DL1 to DLm extend from the data driver 230 in parallel with the second direction DR2 and are arranged spaced from each other in the first direction DR1.

The plurality of pixels PX are electrically connected to the first scan lines SCL1 to SCLn, the second scan lines SSL1 to SSLn, and the data lines DL1 to DLm. For example, the first row of pixels may be connected to the scan lines SCL1 and SSL1, the second row of pixels may be connected to the scan lines SCL2 and SSL2, the third row of pixels may be connected to the scan lines SCL3 and SSL3, etc.

Each of the plurality of pixels PX includes a light emitting element ED (see FIG. 4) and a pixel circuit PXC (see FIG. 4) for controlling the emission of the light emitting element ED. The pixel circuit PXC may include a plurality of transistors and a capacitor. The scan driver 250 may include transistors formed through the same process as the pixel circuit PXC. In an embodiment, the light emitting element ED is an organic light emitting diode. However, the present disclosure is not limited thereto.

In an embodiment, the scan driver 250 is arranged on a first side of the display panel DP. The first scan lines SCL1 to SCLn and the second scan lines SSL1 to SSLn extend from the scan driver 250 in parallel with the first direction DR1. The scan driver 250 is positioned adjacent to a first side of the active area AA, but the present disclosure is not limited thereto. In an embodiment, the scan driver 250 may be positioned adjacent to the first side and the second side of the active area AA. For example, the scan driving circuit positioned adjacent to the first side of the active area AA may provide the first scan signals to the first scan lines SCL1 to SCLn, and the scan driving circuit positioned adjacent to the second side of the active area AA may provide the second scan signals to the second scan lines SSL1 to SSLn.

Each of the plurality of pixels PX receives a first driving voltage (or driving voltage) ELVDD, a second driving voltage ELVSS, and an initialization voltage VINT. The first driving voltage ELVDD may be higher than the second driving voltage ELVSS.

The voltage generator 300 generates voltages used to operate the display panel DP. In an embodiment of the present disclosure, the voltage generator 300 generates the first driving voltage ELVDD, the second driving voltage ELVSS, and the initialization voltage VINT, which are used for an operation of the display panel DP. The first driving voltage ELVDD, the second driving voltage ELVSS, and the initialization voltage VINT may be provided to the display panel DP through a first voltage line VL1 (or a driving voltage line), a second voltage line VL2, and a third voltage line VL3.

As well as the first driving voltage ELVDD, the second driving voltage ELVSS, and the initialization voltage VINT, the voltage generator 300 may further generate various voltages (e.g., a gamma reference voltage, a data driving voltage, a gate-on voltage, and a gate-off voltage) used for operations of the data driver 230 and the scan driver 250.

As an example of the present disclosure, the driving controller 100 shown in FIG. 3 may be mounted on the circuit boards PCB shown in FIG. 2. Alternatively, the driving controller 100 may be disposed on the driver chips DIC shown in FIG. 2 together with the data driver 230.

Figure 4:
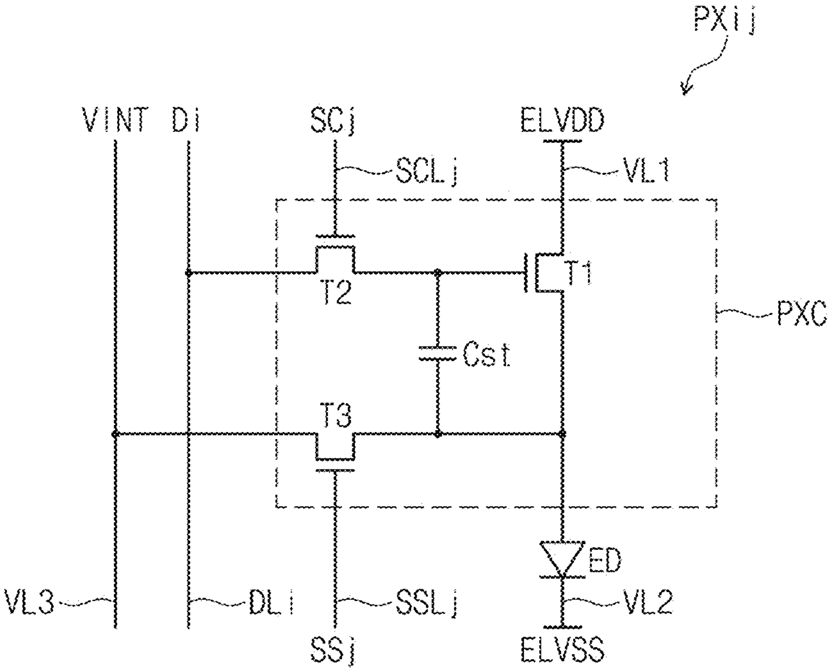
FIG. 4 is a circuit diagram of a pixel according to an embodiment of the present disclosure.

FIG. 4 is a circuit diagram of a pixel, according to an embodiment of the present disclosure.

FIG. 4 illustrates an equivalent circuit diagram of a pixel PXij connected to an i-th data line DLi among the data lines DL1 to DLm, a j-th first scan line SCLj among the first scan lines SCL1 to SCLn, and a j-th second scan line SSLj among the second scan lines SSL1 to SSLn, which are illustrated in FIG. 1.

Each of the plurality of pixels PX shown in FIG. 3 may have the same circuit configuration as the equivalent circuit of the pixel PXij shown in FIG. 4. In an embodiment, the pixel PXij includes the at least one light emitting element ED and the pixel circuit PXC.

The pixel circuit PXC may include at least one transistor, which is electrically connected to the light emitting element ED and which is used to provide a current corresponding to a data signal Di delivered from the i-th data line DLi to the light emitting element ED. As an example of the present disclosure, the pixel circuit PXC of the pixel PXij includes a first transistor T1, a second transistor T2, a third transistor T3, and a capacitor Cst. Each of the first to third transistors T1 to T3 may be an N-type transistor by using an oxide semiconductor as a semiconductor layer. However, the present disclosure is not limited thereto. For example, each of the first to third transistors T1 to T3 may be a P-type transistor having a low-temperature polycrystalline silicon (LTPS) semiconductor layer. Alternatively, at least one of the first to third transistors T1 to T3 may be an N-type transistor and the others thereof may be P-type transistors.

Referring to FIG. 4, the j-th first scan line SCLj may deliver the first scan signal SCj, and the j-th second scan line SSLj may deliver the second scan signal SSj. The i-th data line DLi transfers the data signal Di. The data signal Di may have a voltage level corresponding to the first compensation image data C_DS1 (see FIG. 3) or the second compensation image data C_DS2 (see FIG. 3).

The first driving voltage ELVDD and the initialization voltage VINT may be delivered to the pixel circuit PXC through the first voltage line VL1 and the third voltage line VL3, respectively. The second driving voltage ELVSS may be delivered to a cathode (or a second terminal) of the light emitting element ED through the second voltage line VL2.

The first transistor T1 includes a first electrode connected to the first voltage line VL1, a second electrode electrically connected to an anode (or a first terminal) of the light emitting element ED, and a gate electrode connected to one end of the capacitor Cst. The first transistor T1 may supply an emission current to the light emitting element ED in response to the data signal Di delivered through the data line DLi depending on a switching operation of the second transistor T2.

The second transistor T2 includes a first electrode connected to the data line DLi, a second electrode connected to the gate electrode of the first transistor T1, and a gate electrode connected to the j-th first scan line SCLj. The second transistor T2 may be turned on in response to the first scan signal SCj received through the j-th first scan line SCLj so as to deliver the data signal Di delivered through the i-th data line DLi to the gate electrode of the first transistor T1.

The third transistor T3 includes a first electrode connected to the third voltage line VL3, a second electrode connected to the anode of the light emitting element ED, and a gate electrode connected to the j-th second scan line SSLj. The third transistor T3 may be turned on in response to the second scan signal SSj received through the j-th second scan line SSLj so as to deliver the initialization voltage VINT to the anode of the light emitting element ED.

As described above, one end of the capacitor Cst is connected to the gate electrode of the first transistor T1, and the other end of the capacitor Cst is connected to the second electrode of the first transistor T1. The structure of the pixel PXij according to an embodiment is not limited to the structure illustrated in FIG. 4. The number of transistors included in the pixel PXij, the number of capacitors, and the connection relationship may be modified in various manners.

Figure 5A:
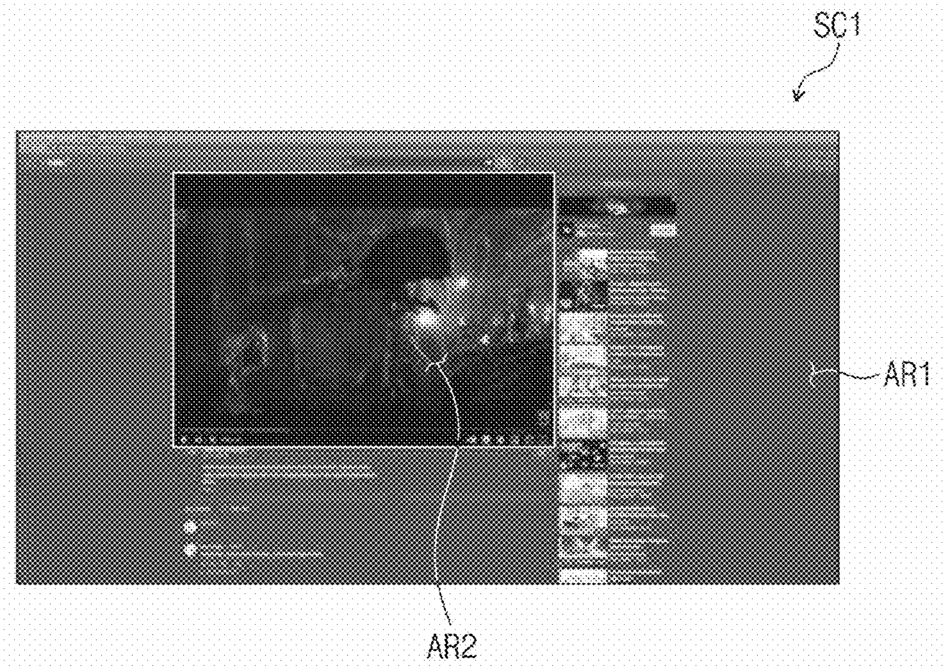
FIG. 5A is a view showing a display screen, according to an embodiment of the present disclosure.
Figure 5B:
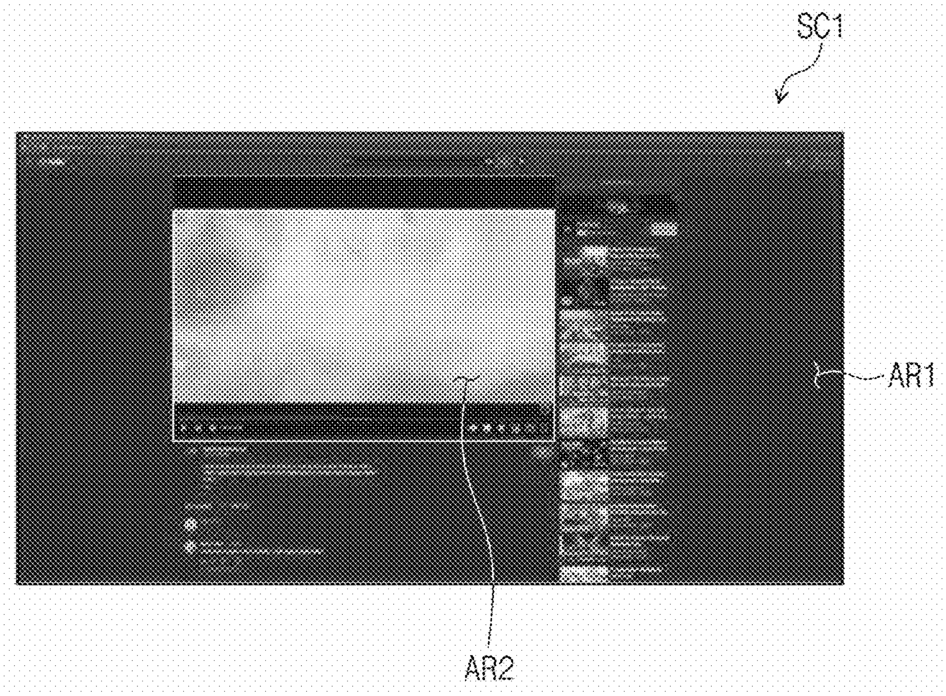
FIG. 5B is a view showing a display screen, according to an embodiment of the present disclosure.
Figure 5C:
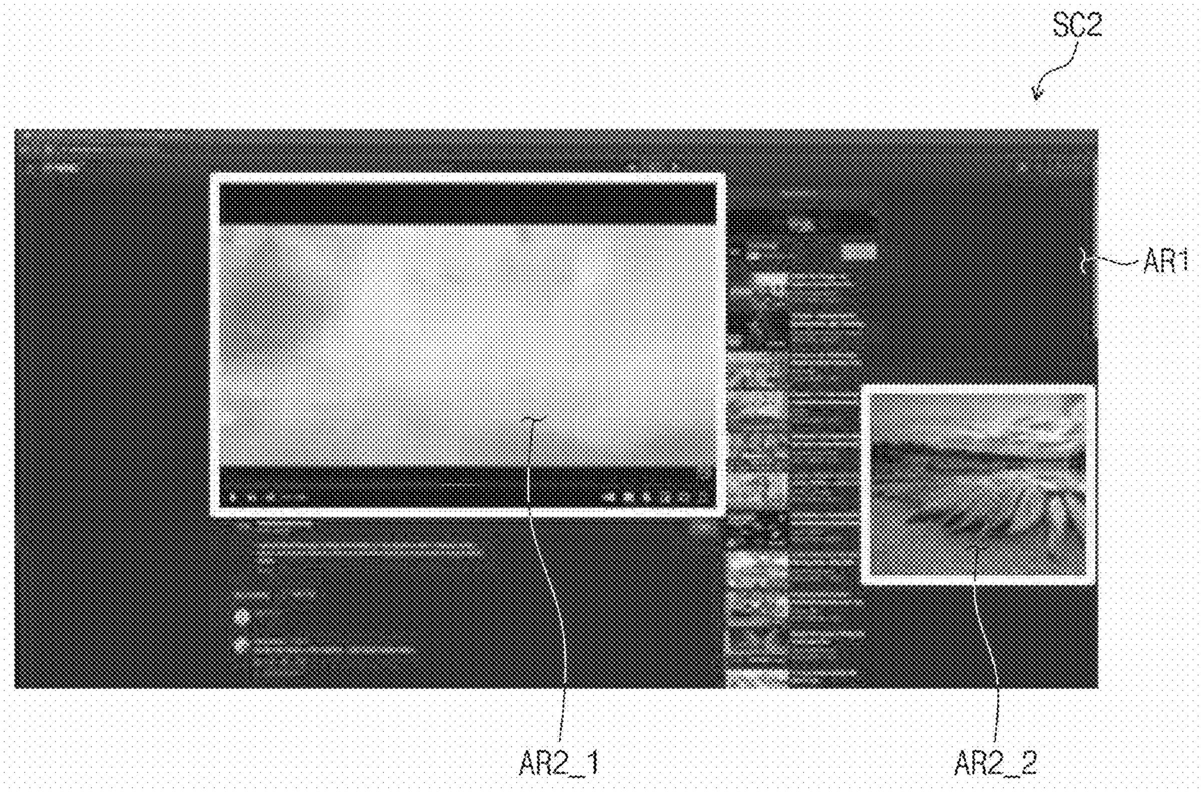
FIG. 5C is a view showing a display screen, according to an embodiment of the present disclosure.

FIGS. 5A to 5C are diagrams illustrating display screens, according to embodiments of the present disclosure.

Referring to FIGS. 5A and 5B, a display screen SC1 displayed on the display device DD (see FIG. 1) according to an embodiment of the present disclosure may include a first area AR1 and a second area AR2. The first area AR1 is defined as an area in which a still image is displayed during a predetermined time or longer. The second area AR2 is defined as an area where a video is displayed. The second area AR2 may be a main area in which the video is displayed from a video streaming-based website. The first area AR1 may be a background area (or may be referred to as a "peripheral area" or a "sub-area") set around the main area.

As an example of the present disclosure, because the video is displayed in the second area AR2, the brightness change of a screen may quickly appear in the second area AR2. FIG. 5A illustrates that the second area AR2 displays an image of relatively low luminance during a first frame (e.g., during a first frame period). FIG. 5B illustrates that the second area AR2 displays an image having relatively high luminance during a second frame (e.g., during a second frame period after or sequential to the first frame period). When a current frame is changed from the first frame to the second frame, a luminance change in the second area AR2 is large. On the other hand, because the first area AR1 continuously displays a background image (e.g., a black image), the luminance of the first area AR1 is almost constant without change.

As shown in FIG. 5C, a display screen SC2 displayed on the display device DD (see FIG. 1) according to an embodiment of the present disclosure may include the first area AR1 and a plurality of second areas AR2_1 and AR2_2. The first area AR1 is defined as an area in which a still image is displayed during a predetermined time or longer. Each of the plurality of second areas AR2_1 and AR2_2 is defined as an area where a video is displayed. Although the two second areas AR2_1 and AR2_2 are illustrated in FIG. 5C, the number of second areas AR2_1 and AR2_2 is not particularly limited thereto.

Because a video is displayed in each of the plurality of second areas AR2_1 and AR2_2, the brightness change of the screen may quickly appear in the second areas AR2_1 and AR2_2. However, because the first area AR1 displays a still image, the luminance of the first area AR1 remains almost constant without change.

Figure 6A:
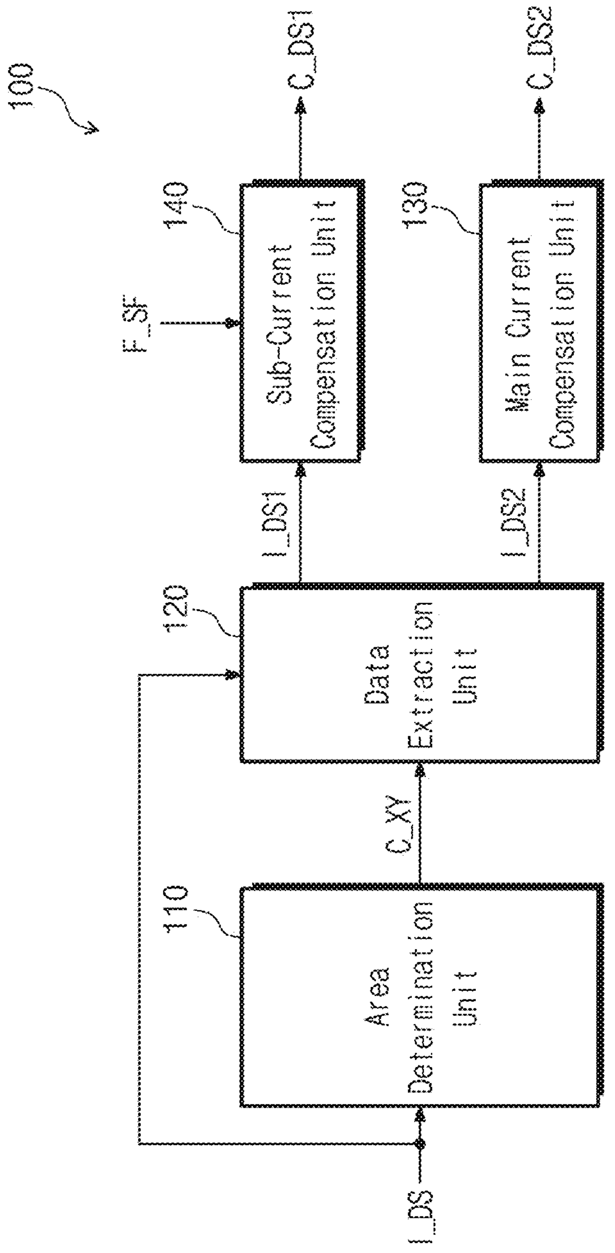
FIG. 6A is an internal block diagram of a driving controller, according to an embodiment of the present disclosure.
Figure 6B:
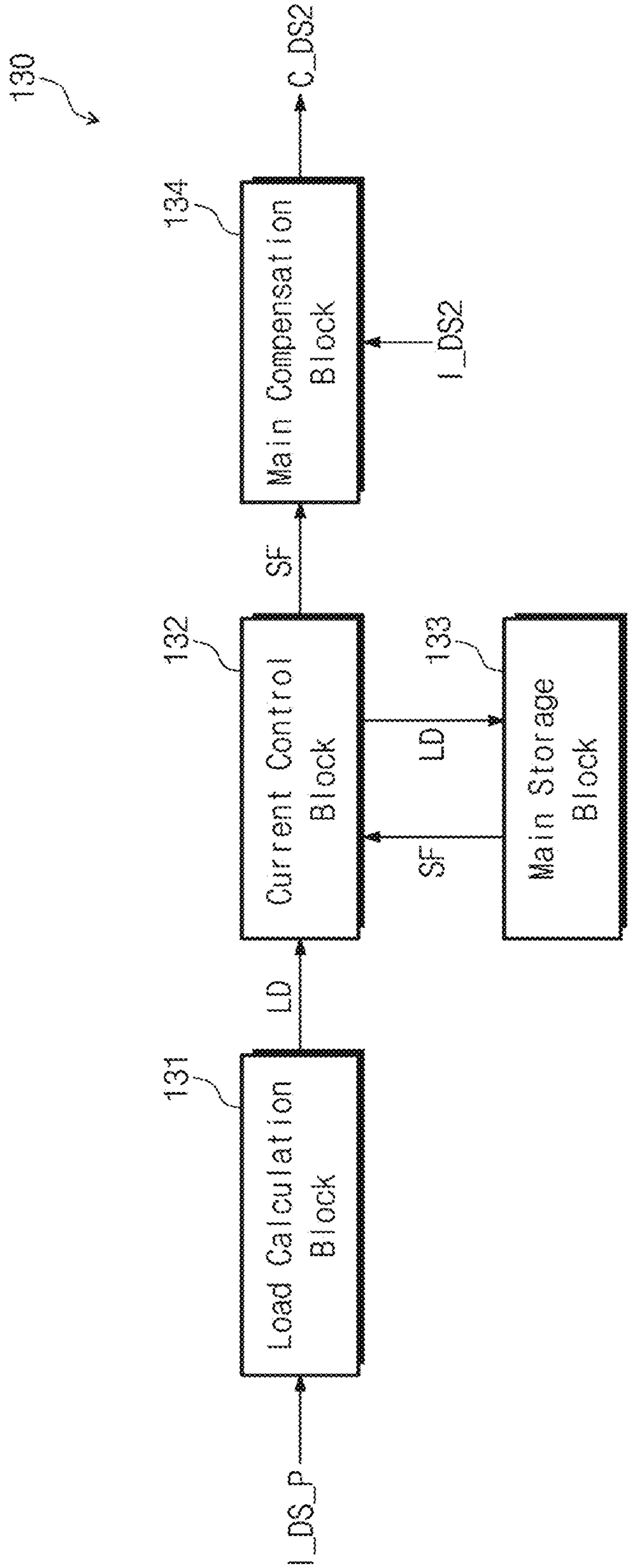
FIG. 6B is an internal block diagram of a main current compensation unit, according to an embodiment of the present disclosure.
Figure 7A:
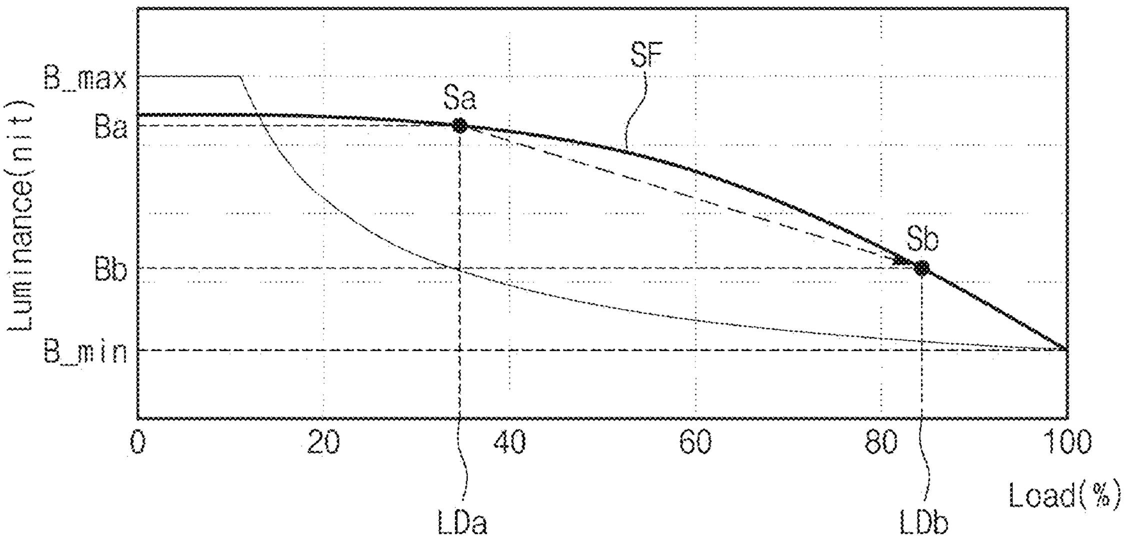
FIG. 7A is a waveform diagram illustrating luminance compensation in the second area shown in FIG. 5A.
Figure 7B:
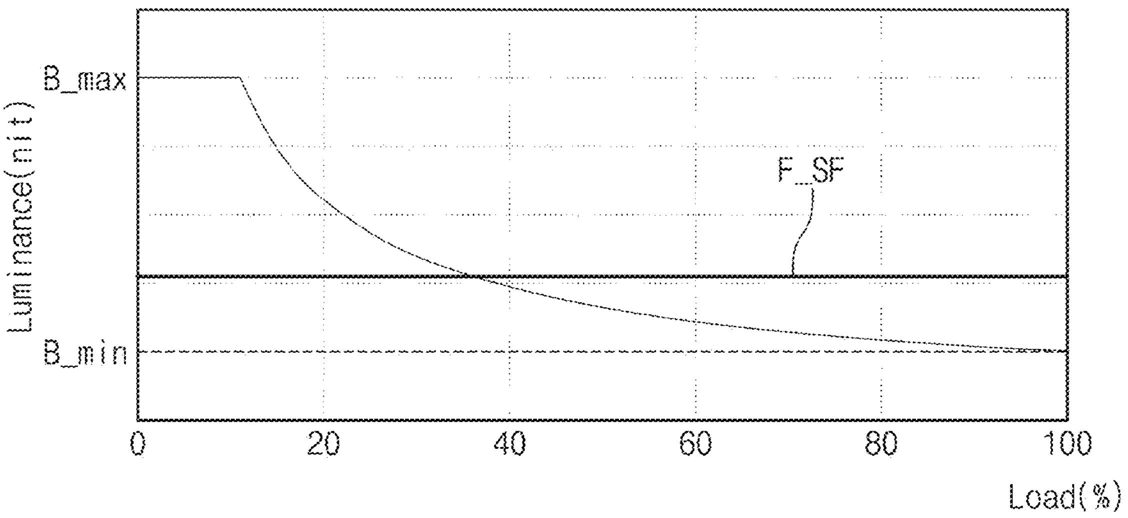
FIGS. 7B and 7C are waveform diagrams illustrating luminance compensation in the first area shown in FIG. 5A.
Figure 7C:
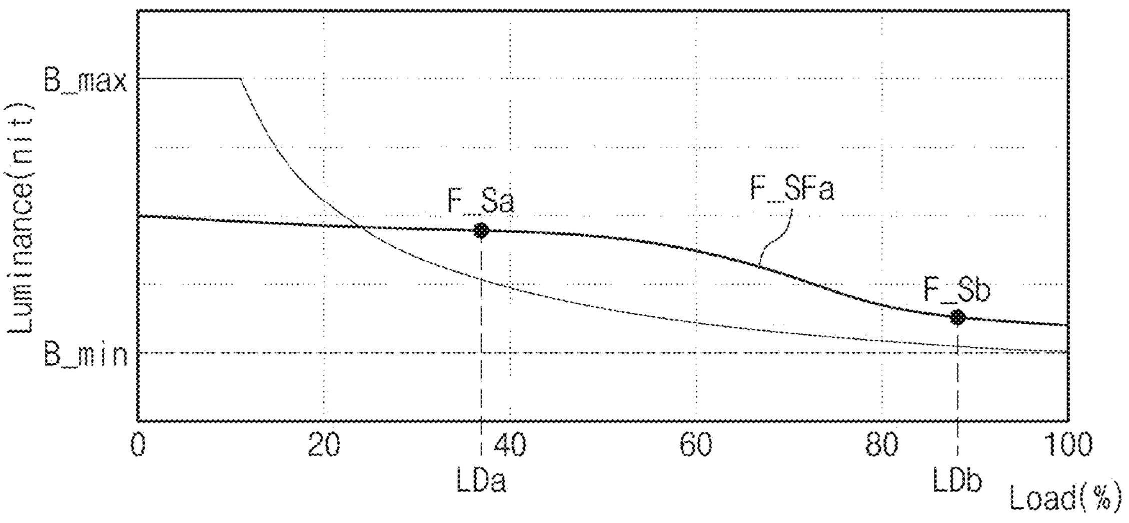

FIG. 6A is an internal block diagram of a driving controller, according to an embodiment of the present disclosure. FIG. 6B is an internal block diagram of a main current compensation unit, according to an embodiment of the present disclosure. FIG. 7A is a waveform diagram illustrating luminance compensation in the second area shown in FIG. 5A. FIGS. 7B and 7C are waveform diagrams illustrating luminance compensation in the first area shown in FIG. 5A.

Referring to FIGS. 5A and 6A, the driving controller 100 includes an area determination unit 110 (e.g., an area determination logic circuit), a data extraction unit 120 (e.g., a data extraction logic circuit), a main current compensation unit 130 (e.g., a main current compensation logic circuit), and a sub-current compensation unit 140 (e.g., a sub-current compensation logic circuit).

The area determination unit 110 may receive image data I_DS during at least 'k' frames (or frame periods) and may determine the first area AR1, in which a still image is displayed, and the second area AR2, in which a video is displayed on the display screen SC1, based on the image data I_DS. The image data I_DS may be a signal converted from the input image signal RGB (see FIG. 3). Here, 'k' may be an integer of 2 or more.

The area determination unit 110 determines that an area having no change in the image data I_DS during 'k' frames is the first area AR1, and determines that an area having a change in the image data I_DS during the 'k' frames is the second area AR2. As such, when the first area AR1 and the second area AR2 are determined on the display screen SC1, the area determination unit 110 may generate coordinate information C_XY about at least one of the first and second areas AR1 and AR2. For example, the area determination unit 110 may determine first boundary coordinates of the first area AR1 and second boundary coordinates of the second area AR2 within the active area AA.

The area determination unit 110 provides the coordinate information C_XY to the data extraction unit 120. As an example of the present disclosure, the coordinate information C_XY may be coordinate information about the first area AR1 and/or the second area AR2. For example, the coordinate information C_XY may include the first boundary coordinates of the first area and/or the second boundary coordinates of the second area AR2. The data extraction unit 120 extracts first image data I_DS1 corresponding to the first area AR1 and second image data I_DS2 corresponding to the second area AR2 from the image data LDS based on the coordinate information C_XY. The data extraction unit 120 provides the first image data I_DS1 corresponding to the first area AR1 to the sub-current compensation unit 140 and provides the second image data I_DS2 corresponding to the second area AR2 to the main current compensation unit 130.

The driving controller 100 compensates for the first image data I_DS1 through the sub-current compensation unit 140 in a first compensation method and compensates for the second image data I_DS2 through the main current compensation unit 130 in a second compensation method different from the first compensation method. As an example of the present disclosure, the second compensation method may be a compensation method using a load LD calculated based on previous image data I_DS_P (see FIG. 6B).

Referring to FIGS. 6A and 6B, the main current compensation unit 130 may calculate the load LD based on the previous image data I_DS_P and may output the second compensation image data C_DS2 having a target luminance by compensating the second image data I_DS2 based on the load LD. The main current compensation unit 130 includes a load calculation block 131 (e.g., a load calculation logic circuit), a current control block 132 (e.g., a current control logic circuit), a main storage block 133 (e.g., a storage device or memory), and a main compensation block 134 (e.g., a main compensation logic circuit).

The load calculation block 131 may directly receive the input image signal RGB (see FIG. 3) or may receive the image data I_DS converted from the input image signal RGB. The image data I_DS may be input in units of frames. The load calculation block 131 calculates the load LD for one frame (e.g., a previous frame) based on the image data I_DS (e.g., the previous image data I_DS_P). The current control block 132 receives the load LD from the load calculation block 131.

The main storage block 133 may include a lookup table in which different scale factors SF are stored depending on the size of the load LD. The current control block 132 may select a scale factor SF corresponding to a size of the load LD from among the scale factors SF stored in the main storage block 133. The current control block 132 provides the selected scale factor SF to the main compensation block 134.

The main compensation block 134 may receive the scale factor SF from the current control block 132. Moreover, the main compensation block 134 may receive current image data, that is, the second image data I_DS2 and may generate the second compensation image data C_DS2 by compensating the second image data I_DS2 based on the scale factor SF. For example, the main compensation block 134 may determine a compensation scale based on the scale factor SF and may generate the second compensation image data C_DS2 by lowering the grayscale (or luminance) of the second image data I_DS2 by the compensation scale. Accordingly, an image displayed by using the second compensation image data C_DS2 may have luminance lower than an image displayed by using the second image data I_DS2. Accordingly, when an image is displayed by using the second compensation image data C_DS2, the driving current of the display panel DP may decrease. Accordingly, the total power consumption of the display device DD may be reduced through an operation (or a main current compensation operation) of the main current compensation unit 130.

Referring to FIGS. 6B and 7A, the load LD may have a size ranging from 0% to 100%. For example, when the load LD is 0%, the whole screen of the display panel DP may correspond to displaying a black image having a black grayscale. Moreover, when the load LD is 10%, only a box having 10% of the whole screen of the display panel DP displays an image (hereinafter, referred to as a "white image") having a white grayscale, and the remaining 90% thereof may correspond to displaying a black image. When the load LD is 40%, only a box having 40% of the whole screen of the display panel DP displays a white image, and the remaining 60% thereof may correspond to displaying a black image. When the load LD is 80%, only a box having 80% of the whole screen of the display panel DP displays a white image, and the remaining 20% thereof may correspond to displaying a black image. That is, as the load LD increases, an area size of the box in which the white image is displayed on a screen may increase.

When the load LD is 0%, the scale factor SF may have the highest value. Accordingly, the second compensation image data C_DS2 compensated based on the scale factor SF may have the highest luminance value B_max. On the other hand, when the load is 100%, the scale factor SF may have the lowest value. Accordingly, the second compensation image data C_DS2 compensated based on the scale factor SF may have the lowest luminance value B_min. As an example of the present disclosure, the highest luminance value B_max may be 1000 nits, and the lowest luminance value B_min may be 250 nits.

A load (hereinafter, a first load LDa) of an image displayed on the display screen SC1 during a first frame as shown in FIG. 5A may be different from a load (hereinafter, a second load LDb) of an image displayed on the display screen SC1 during a second frame as shown in FIG. 5B. As such, when the load LD of the image displayed on the display screen SC1 is changed from the first load LDa to the second load LDb, the scale factor SF may be changed from a first scale factor Sa to a second scale factor Sb. When the scale factor SF is changed from the first scale factor Sa to the second scale factor Sb, the luminance of an image (e.g., a white image) displayed in the second area AR2 with the same grayscale may be changed from a first luminance Ba to a second luminance Bb. That is, the main current compensation unit 130 may vary the scale factor SF depending on the load LD, thereby reducing the overall power consumption of the display device DD by lowering the overall luminance when an image having the great load LD is displayed. For example, the overall luminance may be reduced when the when the load LD is increased.

In the case where the first scale factor Sa is changed to the second scale factor Sb, when a change in the scale factor SF is also applied to the first area AR1, the luminance of a black-grayscale image of the first area AR1 may be changed (i.e., down). This change in luminance of the black-grayscale image may be recognized as a blinking.

Referring to FIGS. 6A and 7B, the first compensation method different from the second compensation method may be applied to the first area AR1. That is, the sub-current compensation unit 140 may compensate for the first image data I_DS1 by using a fixed scale factor F_SF. In an embodiment, the fixed scale factor F_SF does not vary depending on the load LD and has a constant value. Accordingly, even though the luminance in the second area AR2 is lowered due to the change of the scale factor SF, the luminance change does not occur in the black-grayscale image of the first area AR1. Accordingly, a flickering phenomenon in the first area AR1 may be removed while the overall power consumption of the display device DD is reduced.

Alternatively, referring to FIG. 7C, a fixed scale factor F_SFa may vary depending on the load LD to reduce the power consumed in the first area AR1. However, the amount of change of the fixed scale factor F_SFa according to the load LD may be smaller than the amount of change of the scale factor SF. When the load LD of an image displayed on the display screen SC1 is changed from the first load LDa to the second load LDb, the fixed scale factor F_SFa may be changed from a first fixed scale factor F_Sa to a second fixed scale factor F_Sb. A difference between the first fixed scale factor F_Sa and the second fixed scale factor F_Sb may be smaller than a difference between the first scale factor Sa (see FIG. 7A) and the second scale factor Sb (see FIG. 7A).

Figure 8:
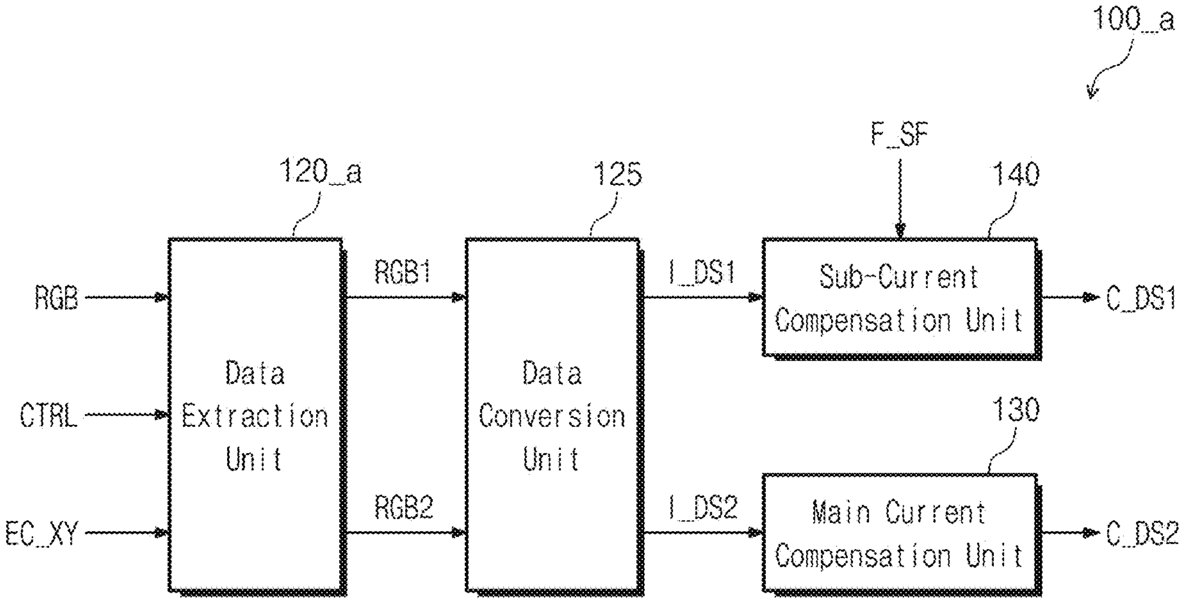
FIG. 8 is an internal block diagram of a driving controller, according to an embodiment of the present disclosure.
Figure 9:
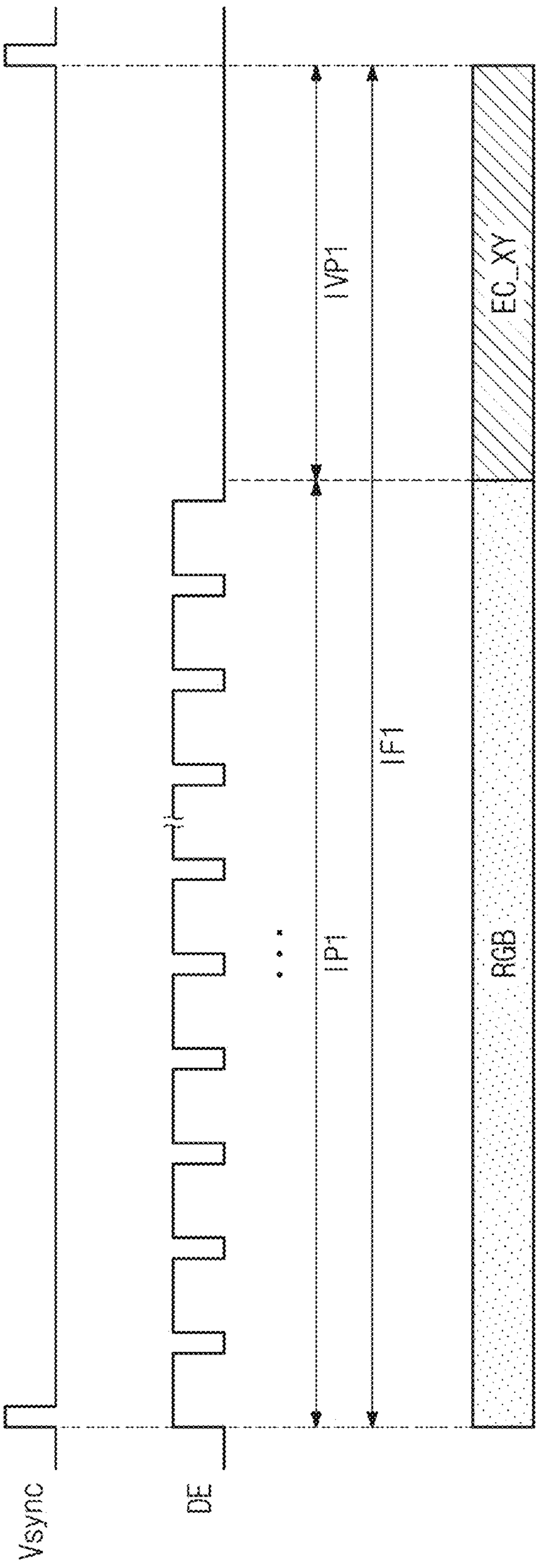
FIG. 9 is a waveform diagram illustrating signals supplied to the driving controller shown in FIG. 8.

FIG. 8 is an internal block diagram of a driving controller, according to an embodiment of the present disclosure. FIG. 9 is a waveform diagram illustrating signals supplied to the driving controller shown in FIG. 8. Components, which are equal to the components illustrated in FIG. 6A, from among components illustrated in FIG. 8 are marked by the same reference signs, and thus, additional description will be omitted to avoid redundancy.

Referring to FIGS. 8 and 9, a driving controller 100_*a* according to an embodiment of the present disclosure may include a data extraction unit 120_*a* (e.g., a data extraction logic circuit), a data conversion unit 125 (e.g., a data conversion logic circuit), the main current compensation unit 130, and the sub-current compensation unit 140. The driving controller 100_*a* may be used to implement the driving controller 100 of FIG. 3.

Unlike the driving controller 100 illustrated in FIG. 6A, the driving controller 100_*a* does not include an area determination unit 110 (see FIG. 6A). Instead, the driving controller 100_*a* may receive coordinate information EC_XY about at least one of the first and second areas AR1 and AR2 (see FIG. 5A) from the outside (e.g., a main controller).

The data extraction unit 120_*a* may receive the input image signal RGB, the control signal CTRL, and the coordinate information EC_XY from the main controller. As an example of the present disclosure, the control signal CTRL may include a vertical synchronization signal Vsync and a data enable signal DE.

A period in which the driving controller 100_*a* receives the input image signal RGB may be defined as an input frame IF1 (or an input frame period). The input frame IF1 includes a data reception section IP1 and a blank section IVP1. During the data reception section IP1, the driving controller 100_*a* may receive the input image signal RGB. The blank section IVP1 may be an idle section in which the input image signal RGB is not received. As an example of the present disclosure, the driving controller 100_*a* may receive the coordinate information EC_XY during the blank section IVP1.

During the blank section IVP1, the driving controller 100_*a* may further receive various display control signals for maximizing a contrast ratio of the second area AR2. As an example of the present disclosure, the coordinate information EC_XY may be included in a display control signal and may be transmitted to the driving controller 100_*a*.

On the basis of the coordinate information EC_XY, the data extraction unit 120_*a* extracts a first image signal RGB1 corresponding to the first area AR1 and a second image signal RGB2 corresponding to the second area AR2 from the input image signal RGB. The data extraction unit 120_*a* provides the first and second image signals RGB1 and RGB2 to the data conversion unit 125.

The data conversion unit 125 converts the first and second image signals RGB1 and RGB2 into the first and second image data I_DS1 and I_DS2, respectively. The data conversion unit 125 provides the first image data I_DS1 to the sub-current compensation unit 140 and provides the second image data I_DS2 to the main current compensation unit 130.

The driving controller 100_*a* compensates for the first image data I_DS1 through the sub-current compensation unit 140 in a first compensation method and compensates for the second image data I_DS2 through the main current compensation unit 130 in a second compensation method different from the first compensation method. As an example of the present disclosure, the second compensation method may be a compensation method using a load LD calculated based on the previous image data I_DS_P (see FIG. 6B).

Figure 10:
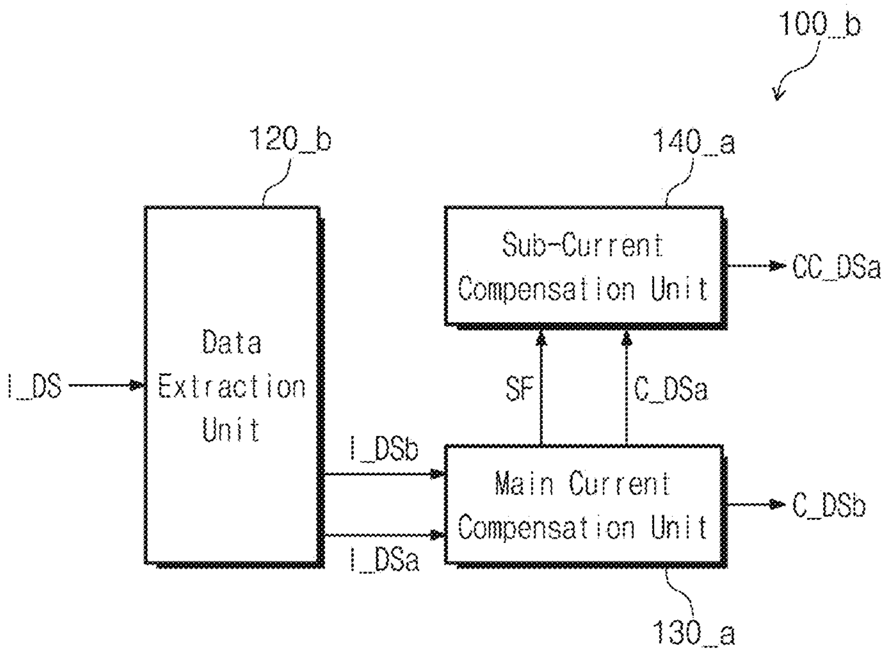
FIG. 10 is an internal block diagram of a driving controller, according to an embodiment of the present disclosure.
Figure 11:
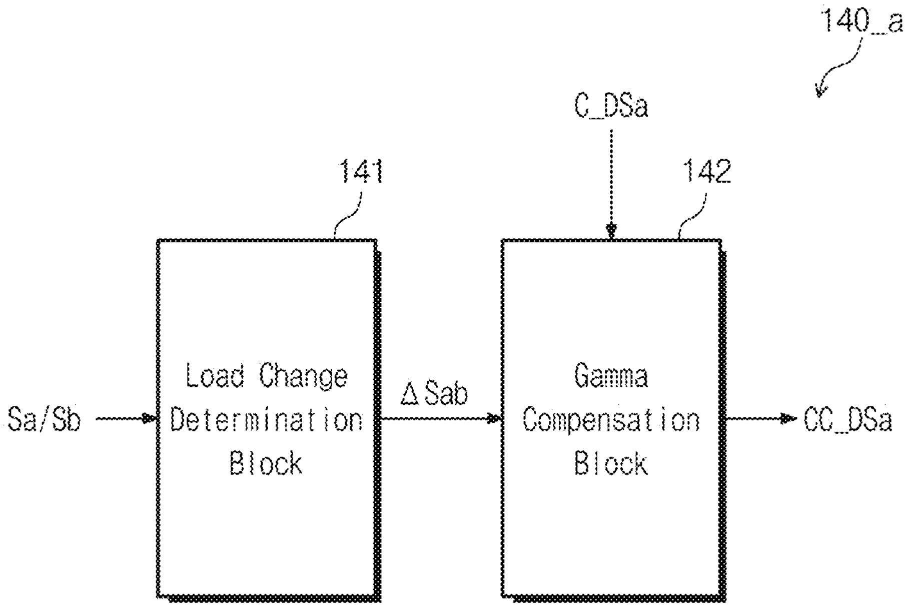
FIG. 11 is an internal block diagram of a sub-current compensation unit, according to an embodiment of the present disclosure.

FIG. 10 is an internal block diagram of a driving controller, according to an embodiment of the present disclosure. FIG. 11 is an internal block diagram of a sub-current compensation unit, according to an embodiment of the present disclosure. FIGS. 12A to 12D are waveform diagrams for describing an operation of the sub-current compensation unit shown in FIG. 11. FIGS. 13A and 13B are waveform diagrams for describing an operation of the gamma compensation block shown in FIG. 11.

Referring to FIG. 10, a driving controller 100_*b* according to an embodiment of the present disclosure may include a data extraction unit 120_*b* (e.g., a data extraction logic circuit), a main current compensation unit 130_*a* (e.g., a main current compensation logic circuit), and a sub-current compensation unit 140_*a* (e.g., a sub-current compensation logic circuit). The driving controller 100 of FIG. 3 may be implemented by the driving controller 100_*b*. Unlike the driving controller 100 illustrated in FIG. 6A, the driving controller 100_*b* does not include an area determination unit 110 (see FIG. 6A).

The data extraction unit 120_*b* receives the image data I_DS during at least 'k' frames and extracts first image data I_DSa and second image data I_DSb from the image data I_DS based on a predetermined reference grayscale. In detail, the data extraction unit 120_*b* extracts a set of data, which is maintained to have a grayscale that is less than or equal to a reference grayscale during 'k' frames or more, in the image data I_DS as the first image data I_DSa. The data extraction unit 120_*b* extracts a set of data, which has a grayscale higher than the reference grayscale or is not maintained to have a grayscale that is less than or equal to the reference grayscale during 'k' frames or more, in image data as the second image data I_DSb. As an example of the present disclosure, when the image data I_DS is within a grayscale range of 0 to 255, the reference grayscale may be set to the grayscale of 32 or less. However, the reference grayscale is not limited thereto. Moreover, the reference grayscale may vary depending on a grayscale range expressed by the image data I_DS.

The data extraction unit 120_*b* provides the first and second image data I_DSa and I_DSb to the main current compensation unit 130_*a*.

The main current compensation unit 130_*a* may receive the first and second image data I_DSa and I_DSb and may output first and second compensation image data C_DSa and C_DSb having target luminance by compensating the image data I_DS based on the load LD (see FIG. 6B) calculated based on the previous image data I_DS_P. The main current compensation unit 130_*a* may have a configuration similar to that of the main current compensation unit 130 illustrated in FIG. 6B. However, unlike the main current compensation unit 130 for compensating the second image data I_DS2 (see FIG. 6B) corresponding to the second area AR2, the main current compensation unit 130_*a* generates the first and second compensation image data C_DSa and C_DSb by compensating the first and second image data I_DSa and I_DSb corresponding to the whole area (i.e., including the first and second areas AR1 and AR2 (see FIG. 5A)).

The sub-current compensation unit 140_*a* may receive the first compensation image data C_DSa and the scale factor SF from the main current compensation unit 130_*a*. The sub-current compensation unit 140_*a* may generate re-compensation data CC_DSa by compensating the first compensation image data C_DSa based on the change amount of the scale factor SF.

Referring to FIGS. 11 and 12A to 12D, the sub-current compensation unit 140_*a* may include a load change determination block 141 and a gamma compensation block 142. The sub-current compensation unit 140_*a* may receive the scale factor SF from the main current compensation unit 130_*a*. The sub-current compensation unit 140_*a* may compensate for the first compensation image data I_DSa based on the change of the scale factor SF.

In detail, the load change determination block 141 may receive the scale factor SF from the main current compensation unit 130_*a*. The load change determination block 141 stores a scale factor corresponding to the load of a previous frame and outputs a scale factor change amount ΔSab by comparing the scale factor corresponding to the load of the previous frame with a scale factor corresponding to the load of a current frame. For example, Sa may be the scale factor of the previous fame and Sb may be the scale factor of the current frame.

Figure 12A:
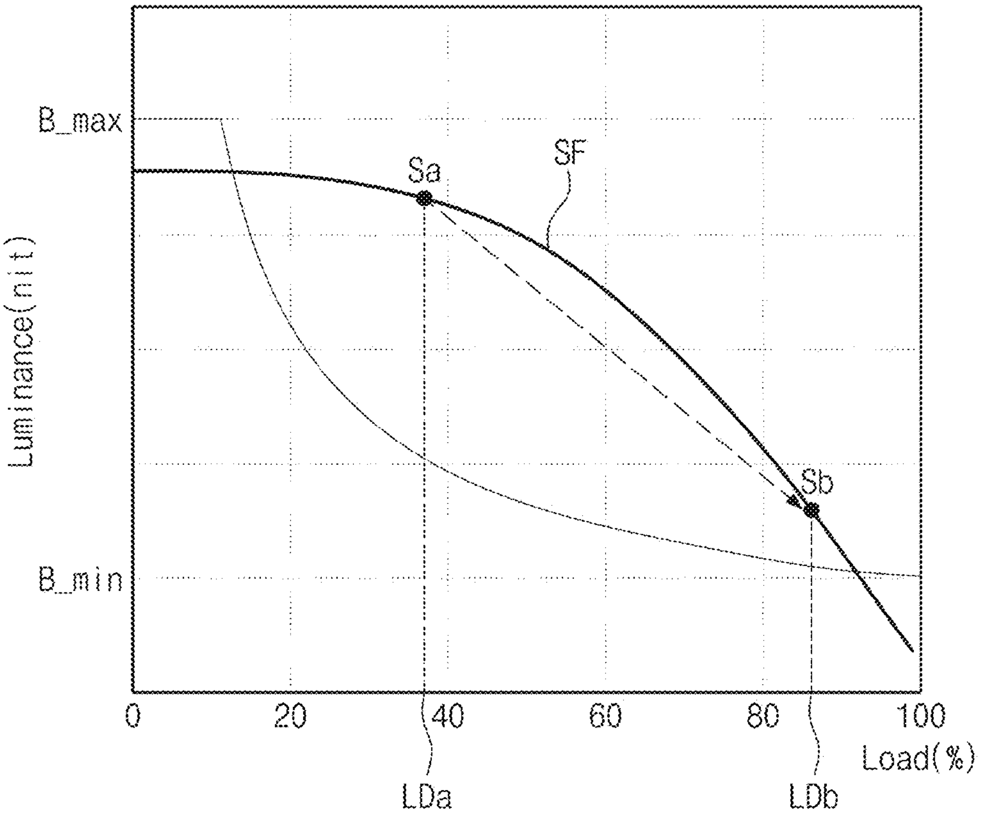
FIGS. 12A to 12D are waveform diagrams for describing an operation of the sub-current compensation unit shown in FIG. 11.
Figure 13A:
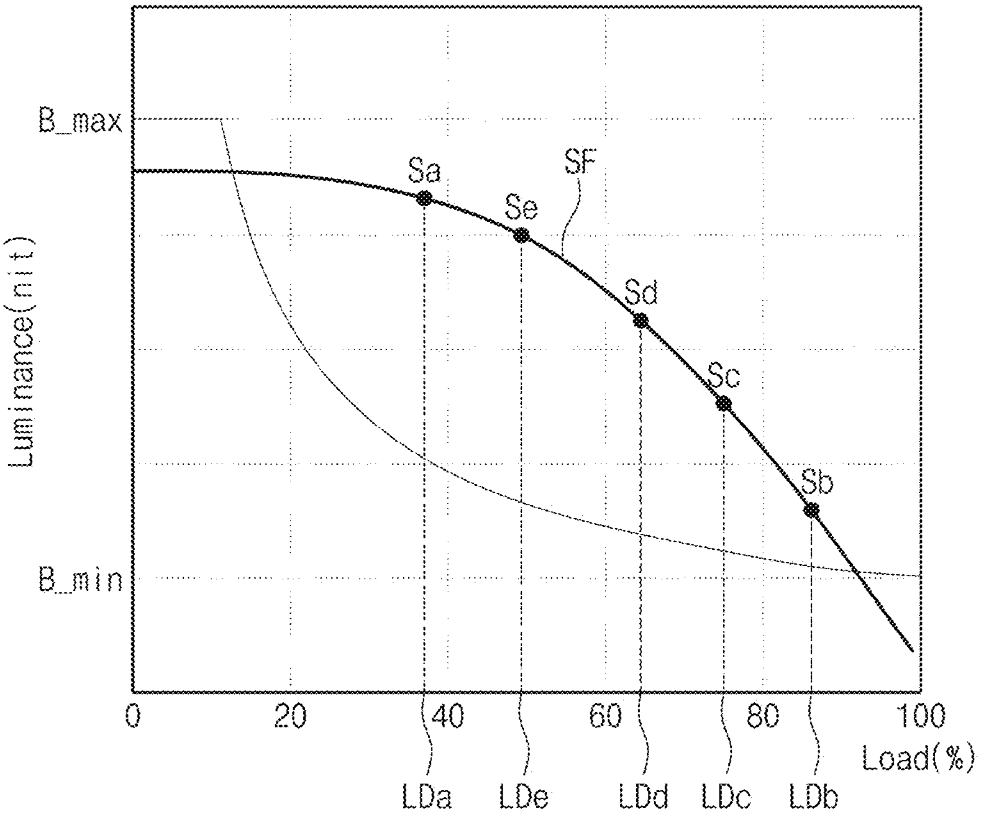
FIGS. 13A and 13B are waveform diagrams for describing an operation of the gamma compensation block shown in FIG. 11.
Figure 13B:
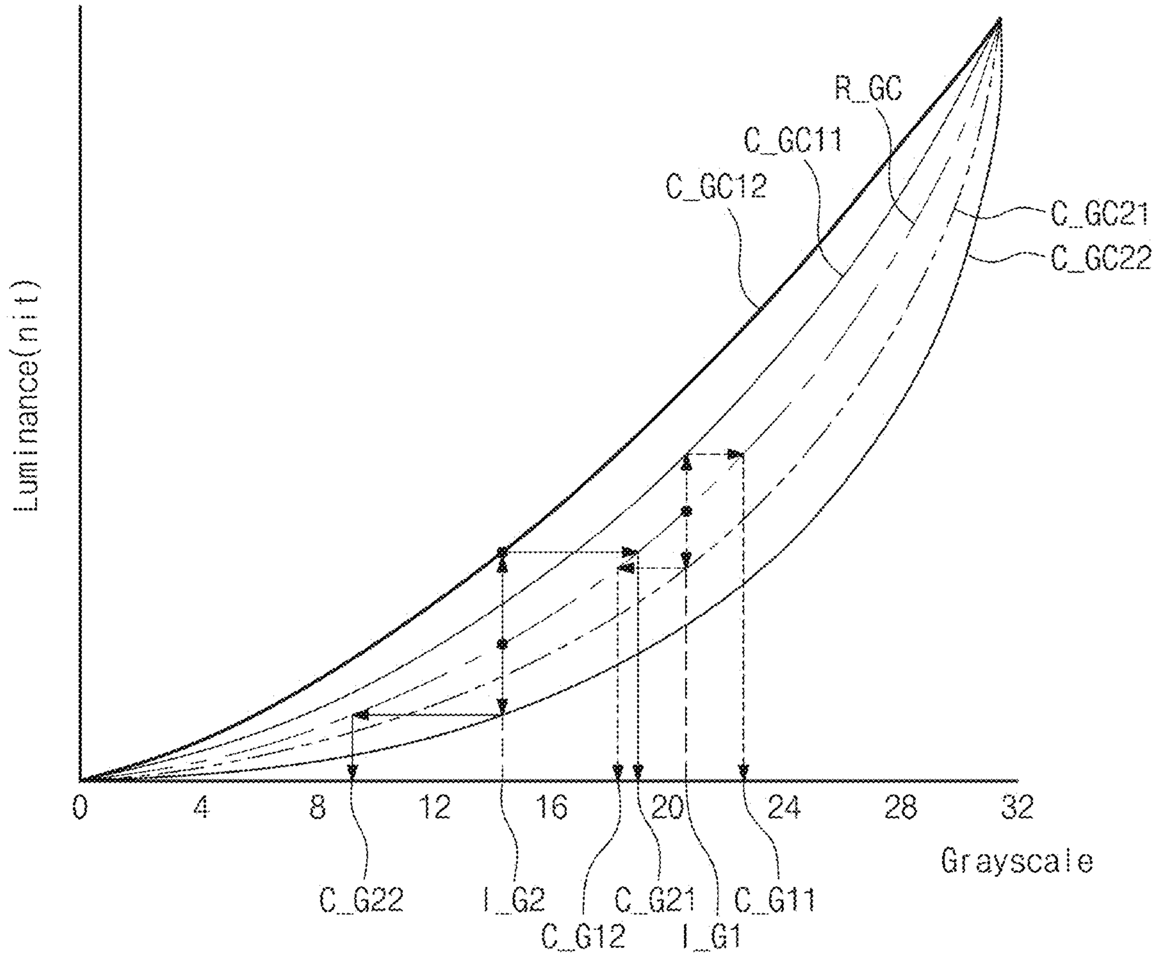

As shown in FIG. 12A, when the previous frame (i.e., a first frame) has the first load LDa, the load change determination block 141 may receive the first scale factor Sa from the main current compensation unit 130_*a*. When the current frame (i.e., a second frame) has the second load LDb, the load change determination block 141 may receive the second scale factor Sb from the main current compensation unit 130_*a*. Because the second scale factor Sb has a value smaller than the first scale factor Sa, the scale factor change amount ΔSab may have a negative value.

Figure 12B:
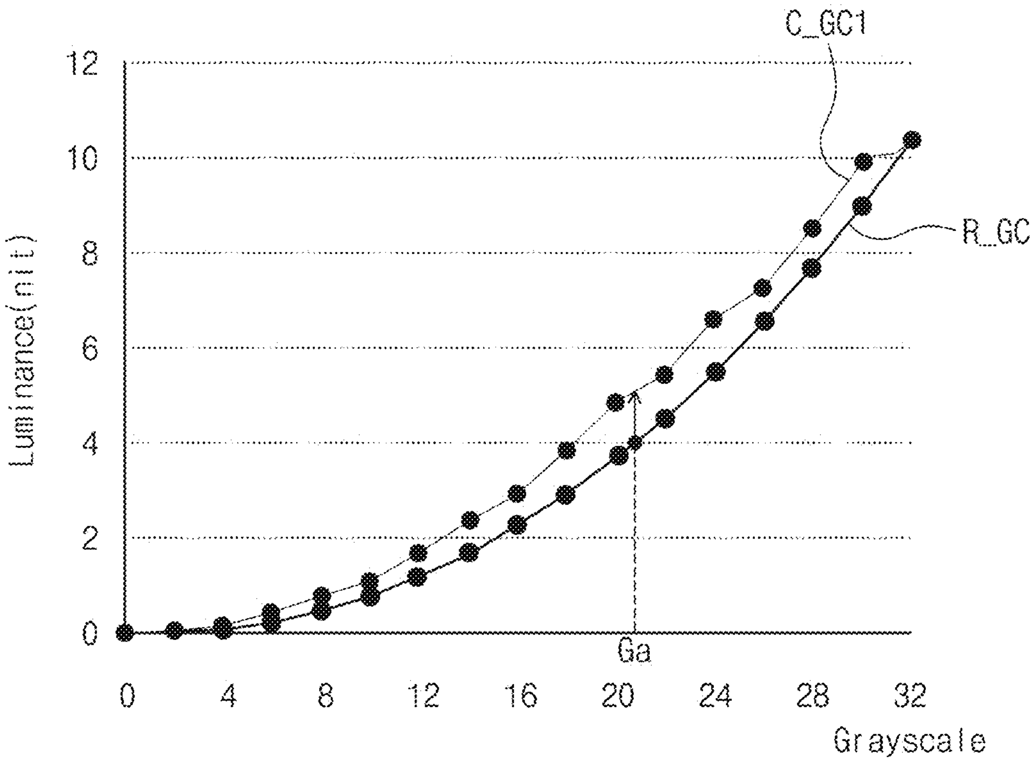
Figure 12C:
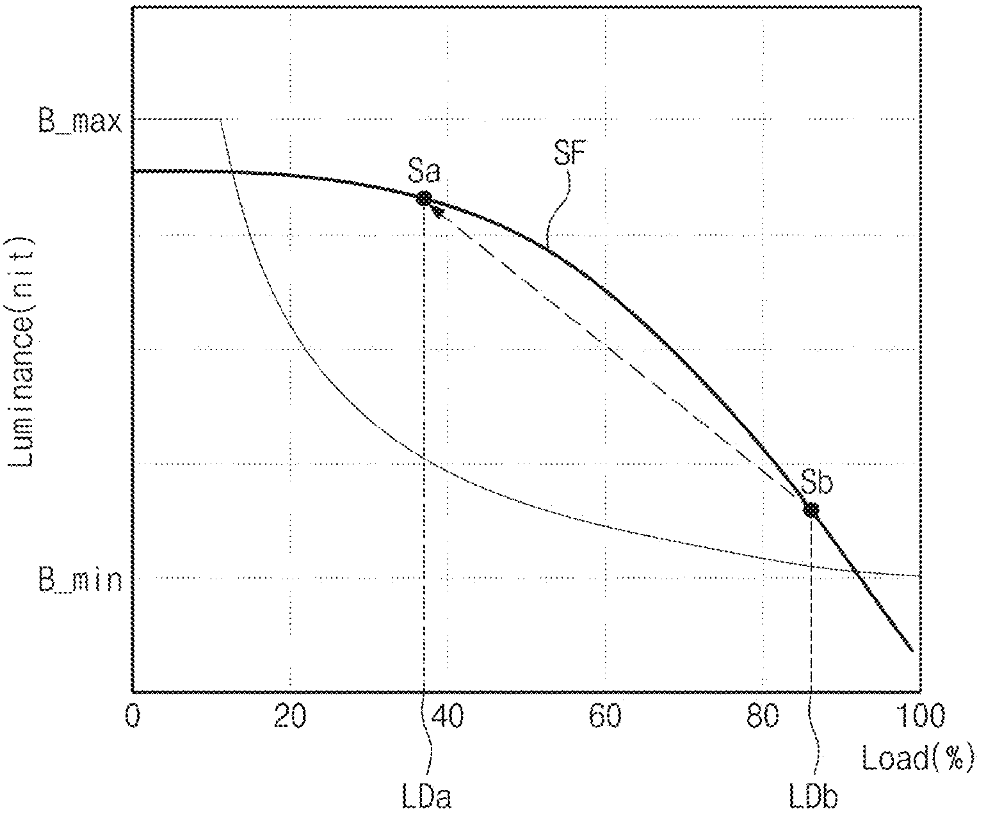
Figure 12D:
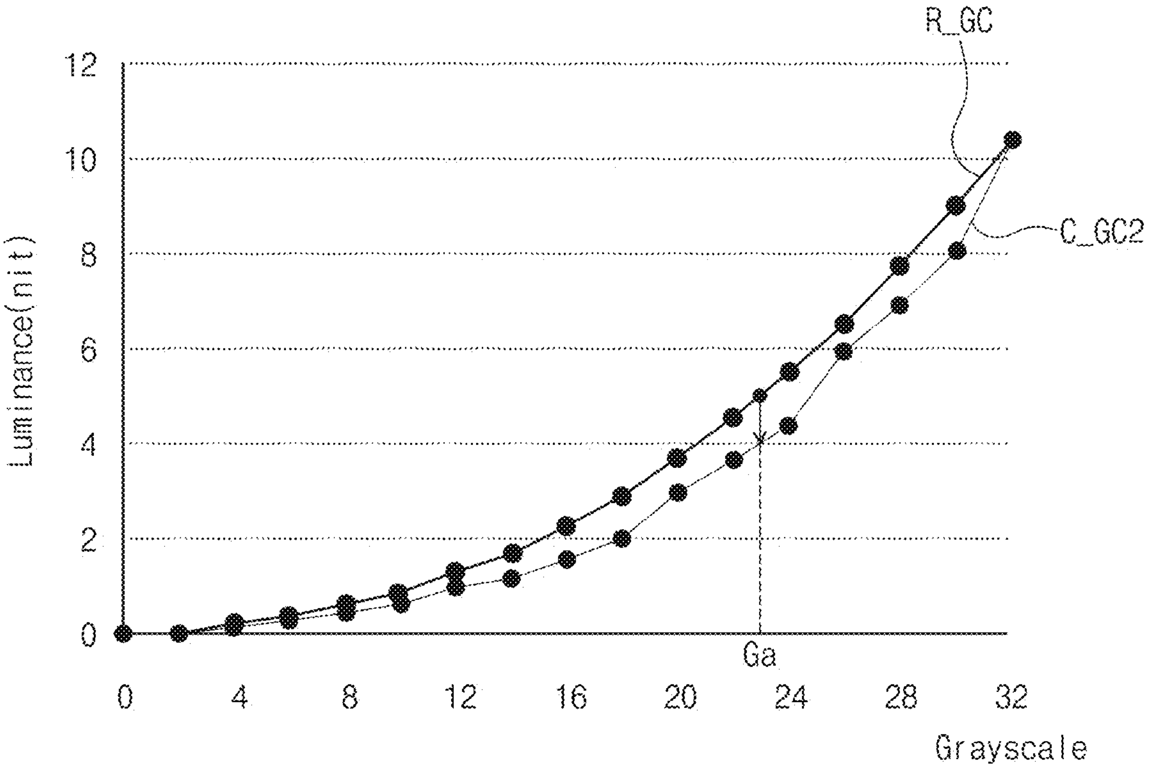

As shown in FIG. 12B, when the previous frame (i.e., the first frame) has the second load LDb, the load change determination block 141 may receive the second scale factor Sb from the main current compensation unit 130_*a*. When the current frame (i.e., the second frame) has the first load LDa, the load change determination block 141 may receive the first scale factor Sa from the main current compensation unit 130_*a*. Because the first scale factor Sa has a value greater than the second scale factor Sb, the scale factor change amount ΔSab may have a positive value.

The gamma compensation block 142 may receive the scale factor change amount ΔSab from the load change determination block 141. The gamma compensation block 142 may generate the re-compensation image data CC_DSa by correcting the gamma of the first compensation image data C_DSa based on the scale factor change amount ΔSab.

Referring to FIGS. 12A to 12D, the first compensation image data C_DSa may have a predetermined reference gamma curve R_GC (i.e., a reference gamma value). The re-compensation data CC_DSa may have compensation gamma curves C_GC1 and C_GC2 (i.e., compensation gamma values) different from the reference gamma curve R_GC. When the scale factor change amount ΔSab is a negative value, the first compensation image data C_DSa may be compensated to have the first compensation gamma curve C_GC1 (i.e., a first compensation gamma value) having a luminance higher than the reference gamma curve R_GC. That is, when the scale factor change amount ΔSab is a negative value (the first case), the re-compensation data CC_DSa may have the first compensation gamma curve C_GC1. When the scale factor change amount ΔSab is a positive value, the first compensation image data C_DSa may be compensated to have the second compensation gamma curve C_GC2 (i.e., a second compensation gamma value) having a luminance lower than the reference gamma curve R_GC. That is, when the scale factor change amount ΔSab is a positive value (the second case), the re-compensation data CC_DSa may have the second compensation gamma curve C_GC2.

Even though the first compensation image data C_DSa having a first grayscale Ga is input to the sub-current compensation unit 140_*a*, the re-compensation data CC_DSa having a different luminance may be output depending on the first and second cases.

The main current compensation unit 130_*a* may convert the first image data I_DSa for maintaining a constant grayscale (particularly, a low grayscale) during the first and second frames into the first compensation image data C_DSa having a luminance different depending on a scale factor. However, the first compensation image data C_DSa is compensated by the sub-current compensation unit 140_*a* as the re-compensation data CC_DSa having a gamma curve different depending on the first and second cases. Since the image is displayed in the grayscale area based on the re-compensation data CC_DSa, it is possible to prevent or reduce the perception of a flickering phenomenon in the low grayscale area due to the luminance compensation by the main current compensation unit 130_*a*.

Referring to FIGS. 11 and 13A, the scale factor SF may have a value different depending on a load. For example, the value of the scale factor SF may vary based on the load. FIG. 13A shows scale factors (i.e., first to fifth scale factors Sa, Sb Sc, Sd, and Se) for first to fifth loads LDa, LDb, LDc, LDd, and LDe. When a change in a load is large, a change in the scale factor SF is also large. When a load is changed in an increasing direction, such as changing from the first load LDa to the second load LDb, the scale factor change amount ΔSab may have a negative value. For example, the scale factor SF may be decreased when the load is increased. When a load is changed in a decreasing direction, such as changing from the third load LDc to the fifth load LDe, the scale factor change amount ΔSab may have a positive value. For example, the scale factor SF may be increased when the load is decreased.

When the scale factor change amount ΔSab has a negative value, the sub-current compensation unit 140_*a* may compensate the first compensation image data C_DSa to have a high gamma curve (e.g., first and second high gamma curves C_GC11 and C_GC12) having a gamma higher than the reference gamma curve R_GC. In the meantime, when the scale factor change amount ΔSab has a positive value, the sub-current compensation unit 140_*a* may compensate the first compensation image data C_DSa to have a low gamma curve (e.g., first and second low gamma curves C_GC21 and C_GC22) having a gamma lower than the reference gamma curve R_GC.

Even though the first compensation image data C_DSa has a first grayscale I_G1, the first compensation image data C_DSa may be changed to the re-compensation data CC_DSa having a grayscale (i.e., the first or second compensation grayscale C_G11 or C_G12) different depending on the scale factor change amount ΔSab. Even though the first compensation image data C_DSa has a second grayscale I_G2, the first compensation image data C_DSa may be changed to the re-compensation data CC_DSa having a grayscale (i.e., the first or second compensation grayscale C_G21 or C_G22) different depending on the scale factor change amount ΔSab.

Figures 14A, 14B:
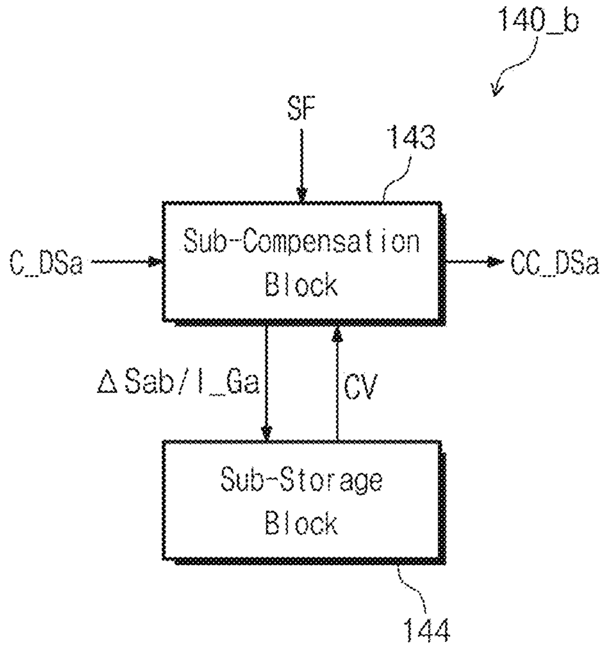
FIG. 14A is an internal block diagram of a sub-current compensation unit, according to an embodiment of the present disclosure.
FIG. 14B is a diagram illustrating a lookup table stored in a sub-storage block, according to an embodiment of the present disclosure.

FIG. 14A is an internal block diagram of a sub-current compensation unit, according to an embodiment of the present disclosure. FIG. 14B is a diagram illustrating a lookup table stored in a sub-storage block, according to an embodiment of the present disclosure.

Referring to FIG. 14A, a sub-current compensation unit 140_*b* may include a sub-compensation block 143 and a sub-storage block 144. The sub-current compensation unit 140_*a* of FIG. 10 may be implemented by the sub-current compensation unit 140_*b*.

The sub-compensation block 143 may receive the first compensation image data C_DSa and the scale factor SF from the main current compensation unit 130_*a*. The sub-compensation block 143 stores a scale factor corresponding to the load of a previous frame and generates the scale factor change amount ΔSab by comparing the scale factor corresponding to the load of the previous frame with a scale factor corresponding to the load of a current frame. The sub-compensation block 143 may output the re-compensation data CC_DSa by compensating the first compensation image data C_DSa with reference to the sub-storage block 144.

The sub-storage block 144 may include a grayscale I_Ga of the first compensation image data C_DSa and a lookup table C_LUT in which compensation values according to the scale factor change amount ΔSab are stored.

When the scale factor change amount ΔSab has a negative value, compensation values may have positive values. For example, the lookup table C_LUT has a compensation value of +10 for a grayscale of 4 when the scale factor change amount ΔSab is a −0.4, has a compensation value of +8 when the scale factor change amount ΔSab is a −0.3, etc. When the scale factor change amount ΔSab has a positive value, compensation values may have negative values. For example, the lookup table C_LUT has a compensation value of −6 for a grayscale of 4 when the scale factor change amount ΔSab is 0.3, a compensation value of −9 for a grayscale of 4 when the scale factor change amount ΔSab is 0.4, etc. While various compensation values, scale factor change amounts ΔSab and grayscales are shown in the lookup table C_LUT, embodiments of the present disclosure are not limited thereto. For example, the compensation values, scale factor change amounts ΔSab and grayscales the lookup table C_LUT may be changed to other values as needed.

The sub-compensation block 143 may read out a compensation value CV corresponding to the grayscale I_Ga of the first compensation image data C_DSa and the scale factor change amount Δsab from the sub-storage block 144 and may output the re-compensation data CC_Dsa by compensating the first compensation image data C_Dsa based on the compensation value CV.

Since the image is displayed in the grayscale area based on the re-compensation data CC_Dsa, it is possible to prevent or reduce the perception of a flickering phenomenon in the low grayscale area due to the luminance compensation by the main current compensation unit 130_*a*.

In an embodiment, power can be conserved without causing observable flicker by compensating areas of the display device maintained at a low gray level for at least certain time period differently from areas of the display area that are not maintained at the low gray level for at least the certain period.

According to an embodiment of the present disclosure, the flickering phenomenon in a first area may be removed while reducing the overall power consumption of a display device, by applying different luminance compensation methods to the first area, where a still image is displayed, and a second area where a video is displayed.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel configured to display an image;

a panel driver configured to drive the display panel; and a driving controller configured to control driving of the panel driver, wherein the driving controller is configured to:

compensate first image data corresponding to a first area of the display panel where a still image is displayed during at least a predetermined time period, in a first compensation method to generate first compensation image data for the first area; and compensate second image data corresponding to a second area of the display panel different from the first area in a second compensation method different from the first compensation method that uses a load calculated based on previous image data to generate second compensation image data for the second area.

2. The display device of claim 1, wherein the driving controller comprises:

a main current compensation logic circuit configured to calculate the load based on the previous image data, and to output the second compensation image data having a target luminance by compensating the second image data based on the load.

3. The display device of claim 2, wherein a fixed scale factor used to compensate for the first image data in the first compensation method is a constant value, which is not changed depending on the load, and wherein a scale factor used to compensate for the second image data in the second compensation method is changed depending on the load.

4. The display device of claim 2, wherein a fixed scale factor used to compensate for the first image data in the first compensation method is changed depending on the load, wherein a scale factor used to compensate for the second image data in the second compensation method is changed depending on the load, and wherein a change amount of the fixed scale factor is less than a change amount of the scale factor.

5. The display device of claim 2, wherein the driving controller comprises:

an area determination logic circuit configured to receive image data during at least 'k' frames and to determine the first area and the second area based on the image data, wherein 'k' is an integer greater than or equal to 2, and wherein the area determination logic circuit determines the first area as an area where no change occurs in the image data during the 'k' frames, and determines the second areas as an area where a change occurs in the image data during the 'k' frames.

6. The display device of claim 5, wherein the area determination logic circuit generates coordinate information about at least one of the first area and the second area.

7. The display device of claim 6, wherein the driving controller further comprises:

a data extraction logic circuit configured to extract the first image data and the second image data from the image data based on the coordinate information; and a sub-current compensation logic circuit configured to compensate for the first image data in the first compensation method.

8. The display device of claim 5, wherein the second area is provided as a plurality of second areas, and wherein the area determination logic circuit generates coordinate information about the plurality of second areas.

9. The display device of claim 1, wherein the driving controller comprises:

a data extraction logic circuit configured to receive coordinate information about at least one of the first area and the second area and an input image signal and to extract a first input image signal for the first area and a second input image signal for the second area from the input image signal based on the coordinate information; and a data conversion logic circuit configured to convert the first input image signal into the first image data and to convert the second input image signal into the second image data.

10. The display device of claim 9, wherein the driving controller further comprises:

a sub-current compensation logic circuit configured to compensate the first image data in the first compensation method;

a main current compensation logic circuit configured to calculate the load based on the previous image data and to output the second compensation image data having a target luminance by compensating the second image data based on the load.

11. The display device of claim 10, wherein a fixed scale factor used to compensate the first image data in the first compensation method is a constant value, which is not changed depending on the load, and wherein a scale factor used to compensate the second image data in the second compensation method is changed depending on the load.

12. The display device of claim 10, wherein a fixed scale factor used to compensate the first image data in the first compensation method is changed depending on the load, wherein a scale factor used to compensate for the second image data in the second compensation method is changed depending on the load, and wherein a change amount of the fixed scale factor is less than a change amount of the scale factor.

13. The display device of claim 10, wherein the driving controller receives the input image signal in units of frames, and wherein each of the frames includes a data reception section during which the input image signal is received and a blank section during which the coordinate information is received.

14. A display device comprising:

a display panel configured to display an image;

a panel driver configured to drive the display panel; and a driving controller configured to control driving of the panel driver, wherein the driving controller is configured to:

receive image data during at least 'k' frames where 'k' is an integer greater than or equal to 2; and extract first image data, which is maintained to have a grayscale that is less than or equal to a reference grayscale during at least the 'k' frames, and second image data, which has a grayscale higher than the reference grayscale or which is not maintained to have a grayscale that is less than or equal to the reference grayscale during the at least 'k' frames, from the image data based on a predetermined reference grayscale, and wherein the driving controller compensates the first image data in a first compensation method and compensates the second image data in a second compensation method different from the first compensation method.

15. The display device of claim 14, wherein the driving controller comprises:

a main current compensation logic circuit configured to generate first compensation image data by the first image data and second compensation image data by compensating the second image data; and a sub-current compensation logic circuit configured to receive the first compensation image data from the main current compensation logic circuit and to generate re-compensation data by further compensating the first compensation image data.

16. The display device of claim 15, wherein the main current compensation logic circuit is configured to:

calculate a load based on previous image data; and output the first compensation image data and the second compensation image data, each of which has target luminance, by compensating the first image data and the second image data based on the load, and wherein a scale factor used to compensate the first image data and the second image data in the main current compensation logic circuit is changed depending on the load.

17. The display device of claim 16, wherein the sub-current compensation logic circuit comprises:

a load change determination logic circuit configured to store a scale factor corresponding to a load of a previous frame and to output a scale factor change amount by comparing the scale factor corresponding to the load of the previous frame with a scale factor corresponding to a load of a current frame; and a gamma compensation logic circuit configured to compensate for gamma of the first compensation image data based on the scale factor change amount.

18. The display device of claim 17, wherein the gamma compensation logic circuit increases a gamma value of the first compensation image data when the scale factor change amount has a negative value, and decreases the gamma value of the first compensation image data when the scale factor change amount has a positive value.

19. The display device of claim 16, wherein the sub-current compensation logic circuit comprises:

a storage device including a lookup table comprising compensation values according to a grayscale of the first compensation image data and a scale factor change amount; and a sub-compensation logic circuit configured to receive the first compensation image data and the scale factor from the main current compensation logic circuit and to output the re-compensation data by compensating the first compensation image data with reference to the lookup table.

20. The display device of claim 19, wherein, when the scale factor change amount has a negative value, the compensation values have positive values, and wherein, when the scale factor change amount has a positive value, the compensation values have negative values.

21. A display device comprising:

a display panel configured to display an image;

a panel driver configured to drive the display panel; and a driving controller configured to control driving of the panel driver, wherein the driving controller is configured to:

compensate first image data corresponding to a first area of the display panel during at least a predetermined time period, using a fixed scale factor independent of a load of the display panel to generate first compensation image data for the first area; and compensate second image data corresponding to a second area of the display panel using the load to generate second compensation image data for the second area.

22. The display device of claim 21, wherein the load is based on previous image data.

* * * * *